US011902778B2

(12) United States Patent
Davis et al.

(10) Patent No.: US 11,902,778 B2
(45) Date of Patent: Feb. 13, 2024

(54) CREDENTIALED WIRELESS FOB TO CONTROL POWER TOOL DEVICES

(71) Applicant: MILWAUKEE ELECTRIC TOOL CORPORATION, Brookfield, WI (US)

(72) Inventors: Anthony Davis, Brookfield, WI (US); Corey J. Dickert, Oconomowoc, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 533 days.

(21) Appl. No.: 17/050,863

(22) PCT Filed: Aug. 13, 2020

(86) PCT No.: PCT/US2020/046107
§ 371 (c)(1),
(2) Date: Oct. 27, 2020

(87) PCT Pub. No.: WO2021/030549
PCT Pub. Date: Feb. 18, 2021

(65) Prior Publication Data
US 2023/0164550 A1 May 25, 2023

Related U.S. Application Data

(60) Provisional application No. 62/886,132, filed on Aug. 13, 2019.

(51) Int. Cl.
*H04W 12/06* (2021.01)
*H04W 12/69* (2021.01)
(52) U.S. Cl.
CPC .......... *H04W 12/06* (2013.01); *H04W 12/69* (2021.01)

(58) Field of Classification Search
CPC .............................. H04W 12/06; H04W 12/69
See application file for complete search history.

(56) References Cited

U.S. PATENT DOCUMENTS 6,005,489 A 12/1999 Siegle et al.
6,073,064 A 6/2000 Konrad et al.
(Continued)

FOREIGN PATENT DOCUMENTS

CN   110033533 A   7/2019
DE   10029132 A1   1/2002
(Continued)

OTHER PUBLICATIONS

International Search Report and Written Opinion for Application No. PCT/US2020/046107 dated Nov. 17, 2020 (8 pages).
(Continued)

*Primary Examiner* — Meng Li
*Assistant Examiner* — Lydia L Noel
(74) *Attorney, Agent, or Firm* — Michael Best & Friedrich LLP

(57) ABSTRACT

An electronic processor of a wireless fob is configured to establish a first communication link between the wireless fob and an external device, and receive, over the first communication link, first identification information and credential information of a power tool device from the external device. The electronic processor is further configured to receive, via the wireless transceiver, an identification signal including second identification information from the power tool device. The electronic processor is further configured to identify the power tool device by determining that the first identification information matches with the second identification information. The electronic processor is further configured to transmit the credential information to the power tool device to establish a second communication link (Continued)

between the wireless fob and the power tool device and transmit, over the second communication link, a command to the power tool device to control an operation of the power tool device.

20 Claims, 9 Drawing Sheets

(56) References Cited

U.S. PATENT DOCUMENTS

| | | | |
|---|---|---|---|
| 6,469,615 | B1 | 10/2002 | Kady et al. |
| 6,872,121 | B2 | 3/2005 | Wiesner et al. |
| 7,064,502 | B2 | 6/2006 | Garcia et al. |
| 7,211,972 | B2 | 5/2007 | Garcia et al. |
| 7,298,240 | B2 | 11/2007 | Lamar |
| 7,319,395 | B2 | 1/2008 | Puzio et al. |
| 7,339,477 | B2 | 3/2008 | Puzio et al. |
| 7,391,326 | B2 | 6/2008 | Puzio et al. |
| 7,521,892 | B2 | 4/2009 | Funabashi et al. |
| 7,649,464 | B2 | 1/2010 | Puzio et al. |
| RE41,160 | E | 3/2010 | Gilmore et al. |
| RE41,185 | E | 3/2010 | Gilmore et al. |
| 7,688,028 | B2 | 3/2010 | Phillips et al. |
| 7,723,952 | B2 | 5/2010 | Phillips et al. |
| 7,737,844 | B2 | 6/2010 | Scott et al. |
| 7,737,845 | B2 | 6/2010 | Fawcett et al. |
| 7,750,811 | B2 | 7/2010 | Puzio et al. |
| 7,784,104 | B2 | 8/2010 | Innami et al. |
| 7,868,591 | B2 | 1/2011 | Phillips et al. |
| 7,990,109 | B2 | 8/2011 | White et al. |
| 8,044,796 | B1 | 10/2011 | Carr, Sr. |
| 8,129,955 | B2 | 3/2012 | White et al. |
| 8,169,298 | B2 | 5/2012 | Wiesner et al. |
| 8,210,273 | B2 | 7/2012 | Suzuki et al. |
| 8,305,042 | B2 | 11/2012 | Wirnitzer et al. |
| 8,330,426 | B2 | 12/2012 | Suzuki et al. |
| 8,384,349 | B2 | 2/2013 | Suzuki et al. |
| 8,542,090 | B2 | 9/2013 | Calvet et al. |
| 8,742,724 | B2 | 6/2014 | Suzuki et al. |
| 8,971,857 | B2 * | 3/2015 | Nishidai ............... H04W 12/06 |
| | | | 710/16 |
| 9,093,843 | B2 | 7/2015 | Wirnitzer et al. |
| 9,317,018 | B2 | 4/2016 | Spodak et al. |
| 9,466,198 | B2 | 10/2016 | Burch et al. |
| 9,467,862 | B2 | 11/2016 | Zeiler et al. |
| 9,537,335 | B2 | 1/2017 | Furui et al. |
| 9,577,450 | B2 | 2/2017 | Yoshikawa et al. |
| 9,595,839 | B2 | 3/2017 | Furui et al. |
| 9,604,333 | B2 | 3/2017 | Wirnitzer |
| 9,659,422 | B2 | 5/2017 | Lovelock et al. |
| 9,700,997 | B2 | 7/2017 | Schlegel et al. |
| 9,780,583 | B2 | 10/2017 | Furui et al. |
| 9,949,075 | B2 | 4/2018 | Burch et al. |
| 9,953,477 | B2 | 4/2018 | Meganck et al. |
| 9,975,522 | B2 | 5/2018 | Nakamura et al. |
| 9,984,524 | B2 | 5/2018 | Fares et al. |
| 10,031,511 | B2 | 7/2018 | Lukosz et al. |
| 10,087,659 | B2 | 10/2018 | Grant et al. |
| 10,090,962 | B2 | 10/2018 | Jia et al. |
| 10,124,455 | B2 | 11/2018 | Ito et al. |
| 10,285,003 | B2 | 5/2019 | Burch et al. |
| 2005/0035659 | A1 | 2/2005 | Hahn et al. |
| 2005/0128083 | A1 | 6/2005 | Puzio et al. |
| 2005/0200485 | A1 | 9/2005 | Connolly et al. |
| 2006/0087283 | A1 | 4/2006 | Phillips et al. |
| 2006/0087284 | A1 | 4/2006 | Phillips et al. |
| 2007/0143013 | A1 | 6/2007 | Breen |
| 2008/0236220 | A1 | 10/2008 | Calvet et al. |
| 2008/0238609 | A1 | 10/2008 | Wiesner et al. |
| 2009/0273436 | A1 | 11/2009 | Gluck et al. |
| 2010/0148947 | A1 | 6/2010 | Morgan et al. |
| 2010/0279675 | A1 | 11/2010 | Slack et al. |
| 2012/0111589 | A1 | 5/2012 | Schmidt et al. |
| 2013/0109375 | A1 | 5/2013 | Zeiler et al. |
| 2014/0151079 | A1 | 6/2014 | Furui et al. |
| 2015/0061831 | A1 | 3/2015 | Sankey et al. |
| 2015/0102906 | A1 * | 4/2015 | Gerhardt ............... H04W 12/06 |
| | | | 340/5.61 |
| 2015/0277428 | A1 | 10/2015 | Dackefjord |
| 2015/0286209 | A1 | 10/2015 | Kreuzer et al. |
| 2016/0049033 | A1 * | 2/2016 | Sigal ..................... B60R 25/24 |
| | | | 340/5.61 |
| 2016/0311094 | A1 | 10/2016 | Mergener et al. |
| 2016/0325391 | A1 | 11/2016 | Stampfl et al. |
| 2017/0276572 | A1 | 9/2017 | Chen et al. |
| 2017/0353847 | A1 | 12/2017 | Coulis et al. |
| 2017/0364360 | A1 | 12/2017 | Bessegato et al. |
| 2018/0076639 | A1 | 3/2018 | Furui et al. |
| 2018/0143287 | A1 | 5/2018 | Dackefjord et al. |
| 2018/0158316 | A1 * | 6/2018 | Ham ..................... G08C 17/02 |
| 2018/0248446 | A1 | 8/2018 | Mergener et al. |
| 2018/0286158 | A1 | 10/2018 | Dackefjord et al. |
| 2018/0376548 | A1 | 12/2018 | Li |
| 2019/0005802 | A1 | 1/2019 | Fawcett et al. |
| 2019/0027002 | A1 | 1/2019 | Esenwein et al. |
| 2019/0028443 | A1 * | 1/2019 | Chin ................... G07C 9/00571 |
| 2019/0097668 | A1 | 3/2019 | Nicolaidis |
| 2019/0154792 | A1 | 5/2019 | Seman, Jr. et al. |
| 2019/0159034 | A1 * | 5/2019 | Zeiler ................. H04W 12/126 |
| 2020/0137578 | A1 | 4/2020 | Zeiler et al. |

FOREIGN PATENT DOCUMENTS

| | | |
|---|---|---|
| DE | 10029138 A1 | 1/2002 |
| EP | 674973 A1 | 10/1995 |
| EP | 1455319 A2 | 9/2004 |
| EP | 2418553 A2 | 2/2012 |
| EP | 2490395 A1 | 8/2012 |
| EP | 2683203 A1 | 1/2014 |
| GB | 2435001 A | 8/2007 |
| KR | 1020190029920 A | 3/2019 |
| WO | 2018092933 A1 | 5/2018 |

OTHER PUBLICATIONS

Chinese Patent Office Action for Application No. 202080057517.8 dated Jul. 29, 2023 (21 pages including machine English translation).
Extended European Search Report for Application No. 20853014.7 dated Aug. 9, 2023 (8 pages).

* cited by examiner

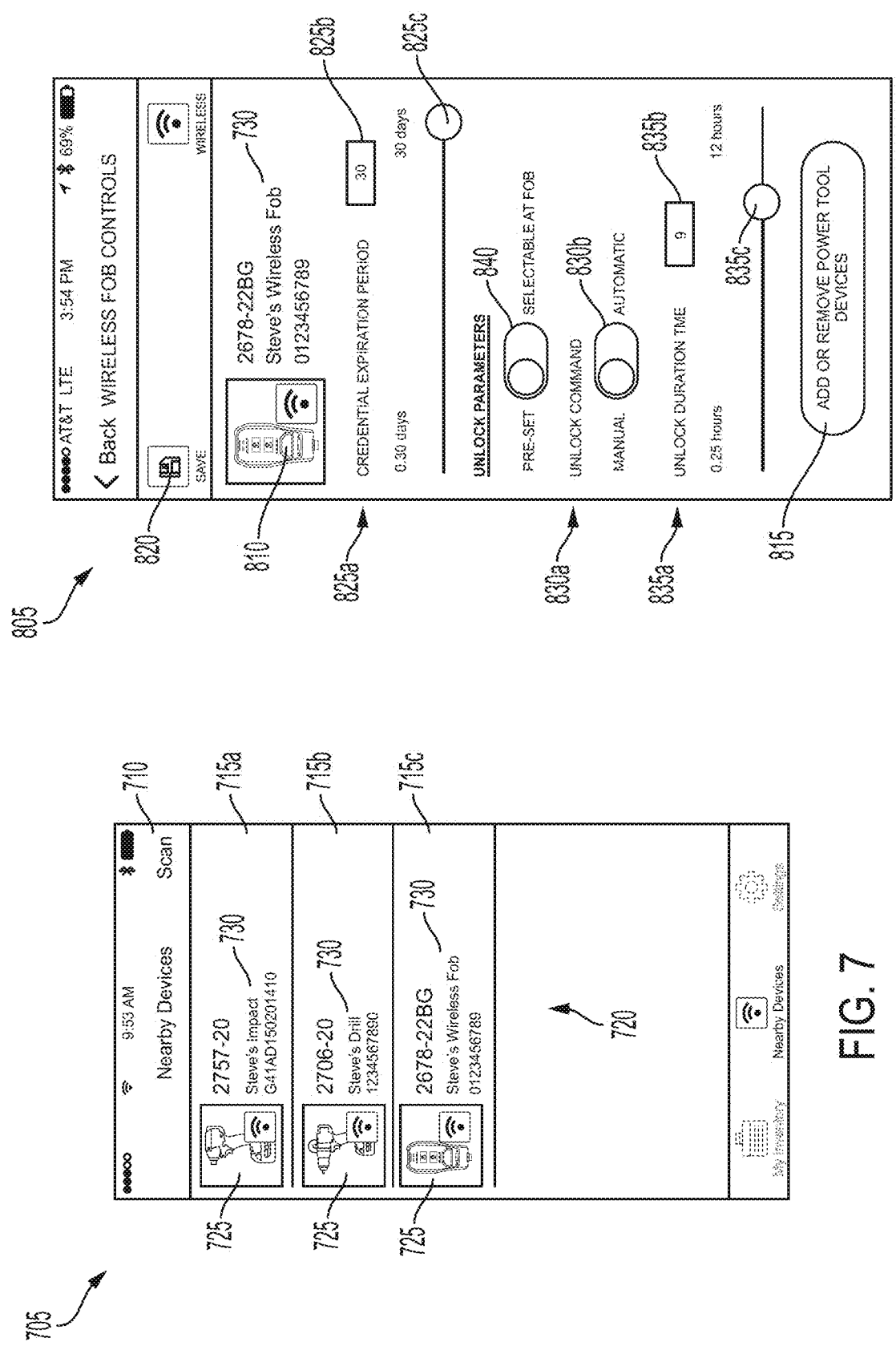

CREDENTIALED WIRELESS FOB TO CONTROL POWER TOOL DEVICES

RELATED APPLICATIONS

This application is a national phase filing under 35 U.S.C. § 371 of International Application No. PCT/US2020/046107, filed on Aug. 13, 2020, which claims the benefit of U.S. Provisional Patent Application No. 62/886,132, filed on Aug. 13, 2019, the entire content of which is hereby incorporated by reference.

FIELD

Disclosed embodiments relate to a wireless fob that communicates with an external device and power tool devices.

SUMMARY

In one embodiment, a wireless fob may include a wireless transceiver, a memory, and an electronic processor coupled to the wireless transceiver and to the memory. The electronic processor may be configured to establish, via the wireless transceiver, a first communication link between the wireless fob and an external device. The electronic processor may be further configured to receive, over the first communication link, first identification information and credential information of a power tool device from the external device. The electronic processor may be further configured to store the first identification information and the credential information in the memory. The electronic processor may be further configured to receive, via the wireless transceiver, an identification signal from the power tool device. The identification signal may include second identification information. The electronic processor may be further configured to identify the power tool device by determining that the first identification information matches with the second identification information. The electronic processor may be further configured to transmit, via the wireless transceiver, the credential information to the power tool device and establish a second communication link between the wireless fob and the power tool device based on the credential information. The electronic processor may be further configured to transmit, over the second communication link, a command to the power tool device to control an operation of the power tool device.

In some embodiments, the electronic processor is configured to receive, over the first communication link and from the external device, an amount of time during which the wireless fob has permission to use the credential information to establish the second communication link. Upon expiration of the amount of time, the electronic processor is configured to cease use of the credential information to establish the second communication link. In some embodiments, the amount of time is set by a user input received via a user interface of the external device. In some embodiments, after the amount of time has expired, the electronic processor is configured to re-establish, via the wireless transceiver, the first communication link between the wireless fob and the external device (or another external device); receive, over the first communication link and from the external device, re-authentication of the permission to use the credential information to establish the second communication link; and transmit, via the wireless transceiver, the credential information to the power tool device to re-establish the second communication link between the wireless fob and the power tool device.

In some embodiments, the command includes a time period during which the operation of the power tool device is to be enabled, wherein the power tool device is configured to disable the operation in response to the time period expiring and another command not being received by the power tool device from the wireless fob within the time period.

In some embodiments, the power tool device includes at least one of the group consisting of (i) a first power tool and (ii) an insertable wireless communication device of a second power tool. In some embodiments, the command includes either an unlock command that allows operation of a motor of at least one of the group consisting of the first power tool and the second power tool in response to a trigger of the at least one of the group consisting of the first power tool and the second power tool being actuated, or a lock command that prevents operation of the motor of at least one of the group consisting of the first power tool and the second power tool in response to a trigger of at least one of the group consisting of the first power tool and the second power tool being actuated.

In some embodiments, the power tool device includes a light device, and the command includes at least one selected from the group consisting of (i) an on command that controls a light of the light device to be on and (ii) an off command that controls the light to be off.

In some embodiments, the wireless fob further includes an electronic output device coupled to the electronic processor and configured to provide an output to a user. In some embodiments, the electronic processor is further configured to in response to receiving the identification signal from the power tool device, provide a notification, via the electronic output device, indicating that the wireless fob has received the identification signal from the power tool device. In some embodiments, the electronic output device includes at least one of the group consisting of a light-emitting diode (LED), a display screen, a speaker, and a haptic device configured to provide a haptic notification.

In some embodiments, the wireless fob further includes an input device coupled to the electronic processor and configured to receive a user input. In some embodiments, the electronic processor is further configured to receive the user input via the input device. In some embodiments, in response to receiving the user input via the input device, the electronic processor is configured to (i) transmit the credential information to the power tool device to establish the second communication link between the wireless fob and the power tool device, and (ii) transmit the command to the power tool device over the second communication link. In some embodiments, the input device is at least one of the group consisting of a physical button and a button provided on a touch screen display.

In some embodiments, in response to identifying the power tool device by determining that the first identification information matches with the second identification information, the electronic processor is configured may be further configured to least one of (i) transmit, via the wireless transceiver, the credential information to the power tool device to establish the second communication link between the wireless fob and the power tool device, and (ii) transmit, over the second communication link, the command to the power tool device to control the operation of the power tool device.

In some embodiments, the electronic processor is further configured to receive, over the first communication link, third identification information and second credential information of a second power tool device from the external device. The electronic processor may be further configured to store the third identification information and the second credential information in the memory. The electronic processor may be further configured to receive, via the wireless transceiver, a second identification signal from the second power tool device. The second identification signal may include fourth identification information. The electronic processor may be further configured to identify the second power tool device by determining that the third identification matches the fourth identification information. The electronic processor may be further configured to transmit, via the wireless transceiver, the second credential information to the second power tool device to establish a third communication link between the wireless fob and the second power tool device. The electronic processor may be further configured to transmit, over the third communication link, a second command to the second power tool device to control an operation of the second power tool device.

In another embodiment, a method of operating a wireless fob to control a power tool device is disclosed. The method may include establishing, via a wireless transceiver of the wireless fob, a first communication link between the wireless fob and an external device. The method may further include receiving, with an electronic processor of the wireless fob and over the first communication link, first identification information and credential information of the power tool device from the external device. The method may further include storing, with the electronic processor, the first identification information and the credential information in a memory of the wireless fob. The method may further include receiving, with the electronic processor via the wireless transceiver, an identification signal from the power tool device. The identification signal may include second identification information. The method may further include identifying, with the electronic processor, the power tool device by determining that the first identification information matches with the second identification information. The method may further include transmitting, with the electronic processor via the wireless transceiver, the credential information to the power tool device and establishing a second communication link between the wireless fob and the power tool device based on the credential information. The method may further include transmitting, with the electronic processor and over the second communication link, a command to the power tool device to control an operation of the power tool device.

In another embodiment, a communication system may include a power tool device including a first wireless transceiver, an external device including a second wireless transceiver, and a wireless fob. The wireless fob may include a third wireless transceiver, a memory, and an electronic processor coupled to the third wireless transceiver and to the memory. The electronic processor may be configured to establish, via the third wireless transceiver and the second wireless transceiver, a first communication link between the wireless fob and the external device. The electronic processor may be further configured to receive, over the first communication link, first identification information and credential information of the power tool device from the external device. The electronic processor may be further configured to store the first identification information and the credential information in the memory. The electronic processor may be further configured to receive, via the third wireless transceiver, an identification signal from the first wireless transceiver. The identification signal may include second identification information. The electronic processor may be further configured to identify the power tool device by determining that the first identification information matches with the second identification information. The electronic processor may be further configured to transmit, via the third wireless transceiver, the credential information to the first wireless transceiver and establish a second communication link between the wireless fob and the power tool device based on the credential information. The electronic processor may be further configured to transmit, over the second communication link, a command to the power tool device to control an operation of the power tool device.

In another embodiment, a wireless fob may include a first wireless transceiver, a second wireless transceiver, a memory, and an electronic processor coupled to the first wireless transceiver, to the second wireless transceiver, and to the memory. The electronic processor may be configured to establish, via the first wireless transceiver, a first communication link between the wireless fob and an external device. The electronic processor may be further configured to receive, over the first communication link, credential information of a plurality of power tool device s from the external device, and store the credential information in the memory. The electronic processor may be further configured to periodically broadcast, via the second wireless transceiver, the credential information and a command to control an operation of one or more power tool devices of the plurality of power tool devices that are within communication range of the second wireless transceiver.

In some embodiments, the command includes a time period during which the operation of the power tool device is to be enabled. The power tool device may be configured to disable the operation in response to the time period expiring, and another broadcasting of the credential information and the command not being received by the power tool device from the wireless fob within the time period.

In some embodiments, the electronic processor is further configured to receive, over the first communication link and from the external device, an amount of time during which the wireless fob has permission to broadcast the credential information. Upon expiration of the amount of time, the electronic processor may be configured to cease broadcasting of the credential information.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIGS. 7 and 8 illustrate example screenshots of a user interface of the external device of the communication system of FIG. 1 according to one example embodiment.

DETAILED DESCRIPTION

Figure 1:
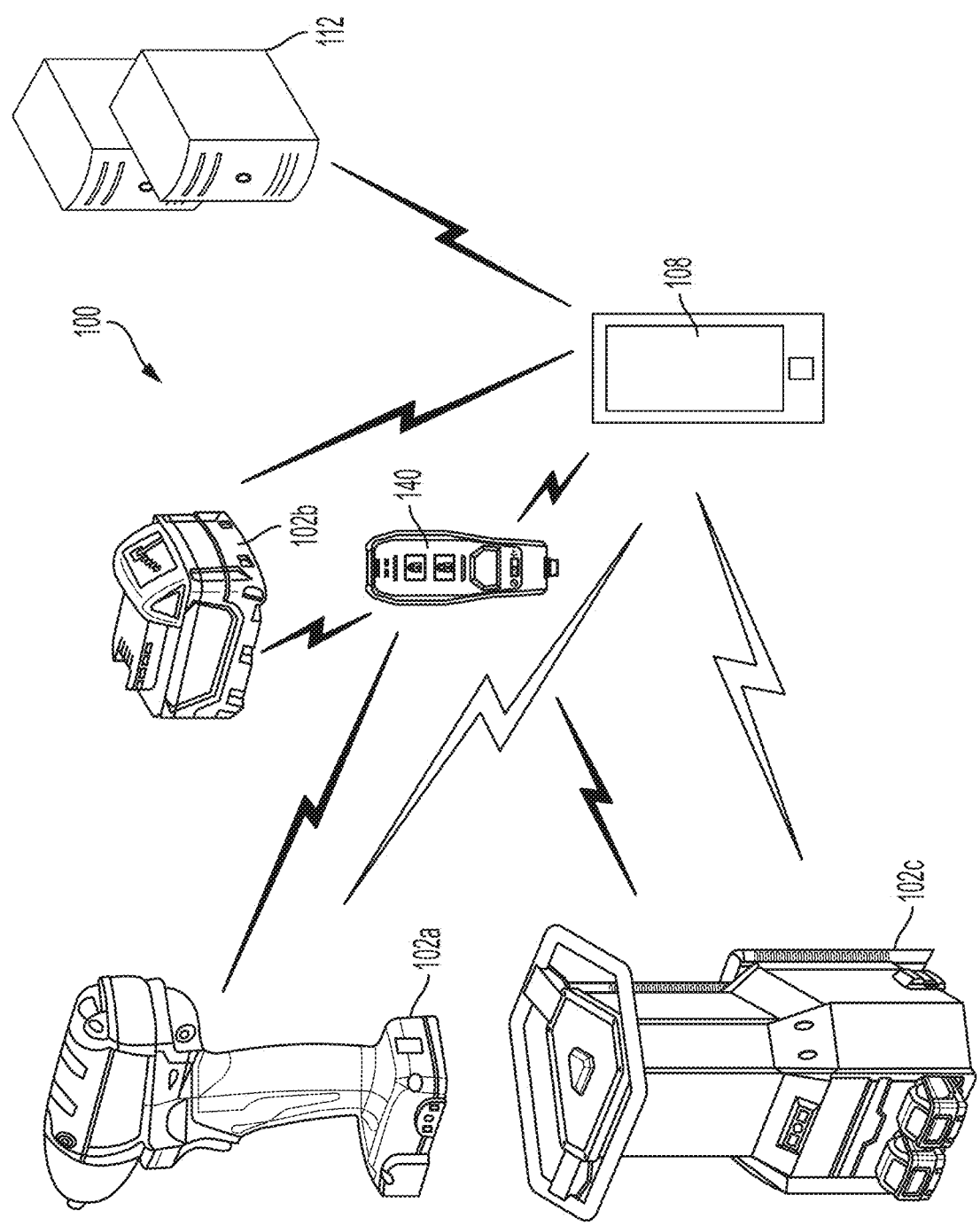
FIG. 1 illustrates a communication system according to one example embodiment.

FIG. 1 illustrates a communication system 100. The communication system 100 includes power tool devices 102 and an external device 108. Each power tool device 102 (e.g., battery powered impact driver 102a, power tool battery pack 102b, and free-standing light device 102c) and the external device 108 can communicate wirelessly while they are within a communication range of each other. Each power tool device 102 may communicate power tool device status, power tool device operation statistics, power tool device identification, stored power tool device usage information, power tool device maintenance data, and the like. Therefore, using the external device 108, a user can access stored power tool device usage or power tool device maintenance data. With this tool device data, a user can determine how the power tool device 102 has been used, whether maintenance is recommended or has been performed in the past, and identify malfunctioning components or other reasons for certain performance issues. The external device 108 can also transmit data to the power tool device 102 for power tool device configuration, firmware updates, or to send commands. For example, the external device 108 may send a command to enable/disable (unlock/lock) the power tool 102a such that when the power tool 102a is locked/disabled, a motor of the power tool 102a is not operational when a trigger of the power tool 102a is actuated. As another example, the external device 108 may send a command to turn/on off a light of the light device 102c. The external device 108 also allows a user to set operational parameters, safety parameters, select tool modes, and the like for the power tool device 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 generates the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

Figure 2:
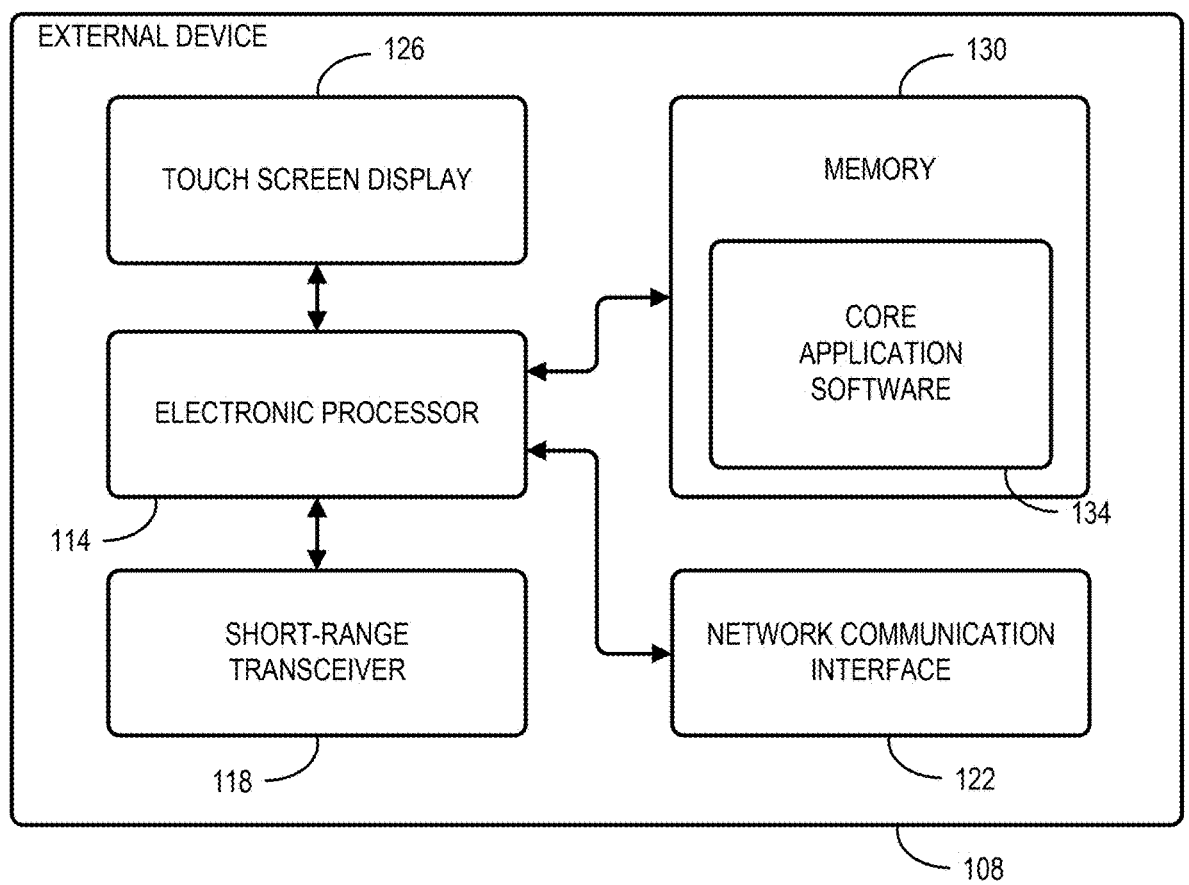
FIG. 2 illustrates a schematic block diagram of an external device of the communication system of FIG. 1 according to one example embodiment.

As shown in FIG. 2, the external device 108 includes an external device electronic processor 114, a short-range transceiver 118, a network communication interface 122, a touch screen display 126, and a memory 130. The external device electronic processor 114 is coupled to the short-range transceiver 118, the network communication interface 122, the touch screen display 126, and the memory 130. The short-range transceiver 118 (i.e., a wireless transceiver), which may include or is coupled to an antenna (not shown), is configured to communicate with a compatible transceiver within the power tool device 102. The short-range transceiver 118 can also communicate with other electronic devices. The network communication interface 122 (i.e., another wireless transceiver that may be referred to as a long-range transceiver) communicates with a network to enable communication with a remote server 112. The network communication interface 122 may include circuitry that enables the external device 108 to communicate with the network. In some embodiments, the network may be an Internet network, a cellular network, another network, or a combination thereof.

The memory 130 of the external device 108 also stores core application software 134. The external device electronic processor 114 accesses and executes the core application software 134 in memory 130 to launch a control application that receives inputs from the user for the configuration and operation of the power tool device 102. The core application software 134 may receive user login information and a password (for example, via user inputs on the touch screen display 126) to associate the external device 108 with a particular user. The short-range transceiver 118 of the external device 108 is compatible with a transceiver of the power tool 104 (described in further detail below). The short-range transceiver 118 may include, for example, a Bluetooth® communication controller. The short-range transceiver 118 allows the external device 108 to communicate with the power tool devices 102. The external device 108, therefore, grants the user access to data related to the power tool devices 102, and provides a user interface such that the user can interact with an electronic processor of the power tool devices 102.

Returning to FIG. 1, the remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices 102 and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The remote server 112 and the external device 108 may bidirectionally communicate with each other over a network that may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless communication interface or with the same wireless communication interface that the power tool device 102 uses to communicate with the external device 108. In some embodiments, the server 112 stores permission information for a plurality of power tool devices 102 and users. The server 112 may use the permission information to determine whether the external device 108 of a user has permission to communicate with one or more power tool devices 102 and for what purposes. In some embodiments, the server 112 stores identification information and credential information for a plurality of power tool devices 102. The server 112 may provide such identification information and credential information to the external device 108 to allow the external device 108 to communicate with one or more of the power tool devices 102 as explained in greater detail herein. For example, in response to a user logging into an application on the external device 108 and verifying their identity (e.g., by entering a correct user name and password), the server 112 may provide identification information and credential information of power tool devices 102 owned by the user to the external device 108.

As shown in FIG. 1, the communication system 100 may also include one or more wireless fobs 140. The wireless fob 140 may be configured to communicate with the external device 108 (e.g., via the short-range transceiver 118) and with the power tool devices 102 as explained in greater detail herein. In some embodiments, the wireless fob 140 receives the identification information and the credential information for one or more power tool devices 102 from the external device 108 to allow the wireless fob 140 to communicate with one or more of the power tool devices 102. Using this information, the wireless fob 140 may establish a communication link between itself and one or more power tool devices 102 to, for example, send an enable/disable command (i.e., unlock/lock command) to the one or more power tool devices 102.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool.

The particular power tool devices 102 illustrated and described herein (e.g., an impact driver 104) are merely representative. Other embodiments of the communication system 100 include a variety of types of power tool devices 102. For instance, the power tool 104 may be another power tool, test and measurement equipment, a vacuum cleaner, a worksite radio, outdoor power equipment, a vehicle, or another device. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other devices can include electronic key boxes, calculators, cellular phones, head phones, cameras, motion sensing alarms, flashlights, freestanding work lights, weather information display devices, a portable power source, a digital camera, a digital music player, a radio, and multi-purpose cutters.

Figure 3:
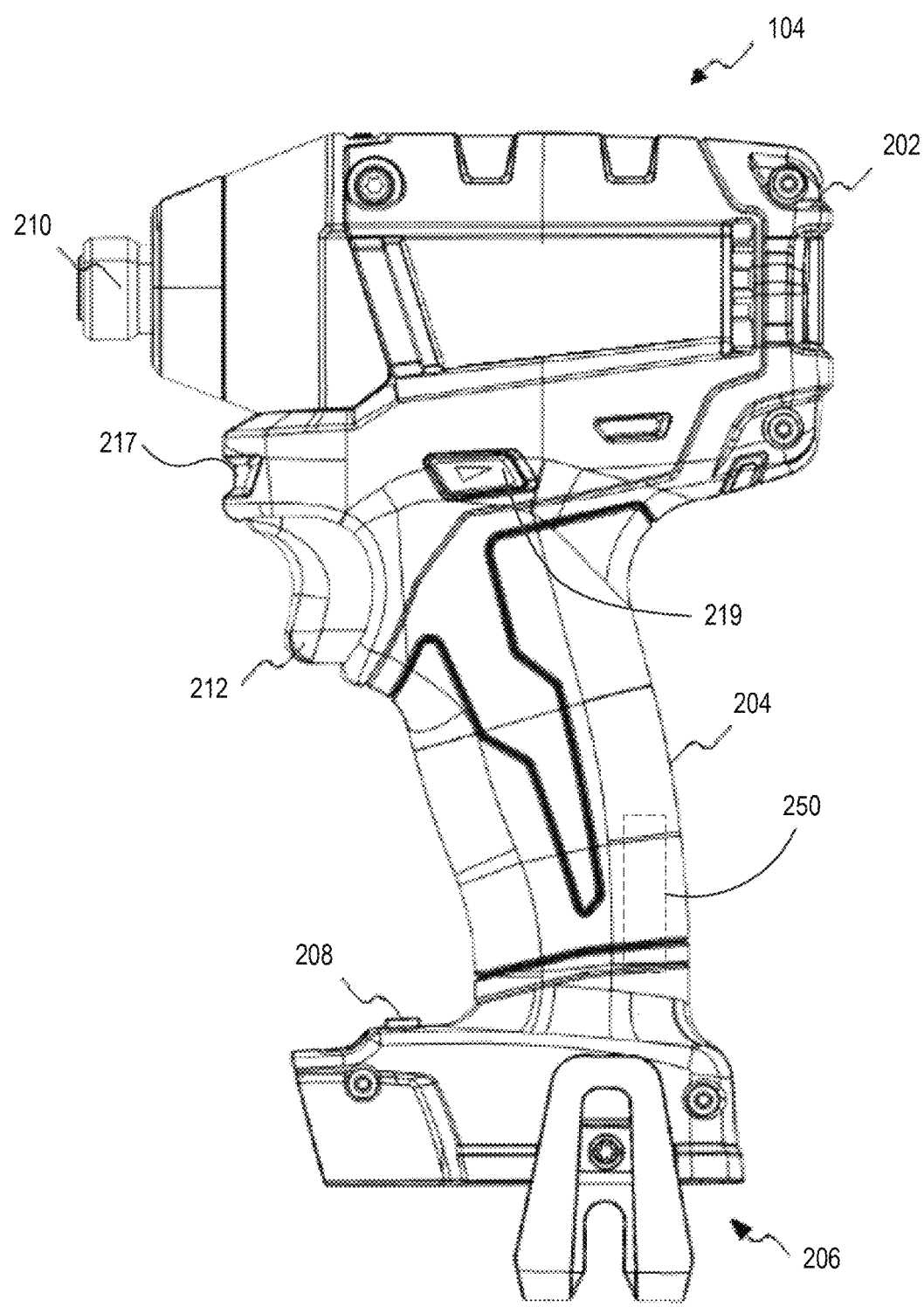
FIG. 3 illustrates a power tool of the communication system of FIG. 1 according to one example embodiment.

FIG. 3 illustrates an example of one of the power tool devices 102 as an impact driver 104 (herein power tool 104). The power tool 104 is representative of various types of power tools that operate within system 100. Accordingly, the description with respect to the power tool 104 in the system 100 is similarly applicable to other types of power tools and power tool devices. As shown in FIG. 3, the power tool 104 includes an upper main body 202, a handle 204, a battery pack receiving portion 206, mode pad 208, an output drive device or mechanism 210, a trigger 212, a work light 217, and forward/reverse selector 219. The power tool 104 further includes a motor 214 within the main body 202 of the housing and having a rotor 280 and a stator 285 (see FIG. 4A). The rotor 280 is coupled to a motor shaft arranged to produce an output outside of the housing via the output drive device or mechanism 210. The housing of the power tool 104 (e.g., the main body 202 and the handle 204) are composed of a durable and light-weight plastic material. The drive device 210 is composed of a metal (e.g., steel). The drive device 210 on the power tool 104 is a socket. However, each power tool 104 may have a different drive device 210 specifically designed for the task (or primary function) associated with the power tool 104. For example, the drive device for a power drill may include a bit driver, while the drive device for a pipe cutter may include a blade. Some power tools devices 102 may not have a drive device (e.g., a light device may include a light that provides illumination of an area as its primary function rather than having a drive device that is moved by a motor). The battery pack receiving portion 206 is configured to receive and couple to the battery pack (e.g., 102b of FIG. 1) that provides power to the power tool 104. The battery pack receiving portion 206 includes a connecting structure to engage a mechanism that secures the battery pack and a terminal block to electrically connect the battery pack to the power tool 104. The mode pad 208 allows a user to select a mode of the power tool 104 and indicates to the user the currently selected mode of the power tool 104.

Figure 4A:
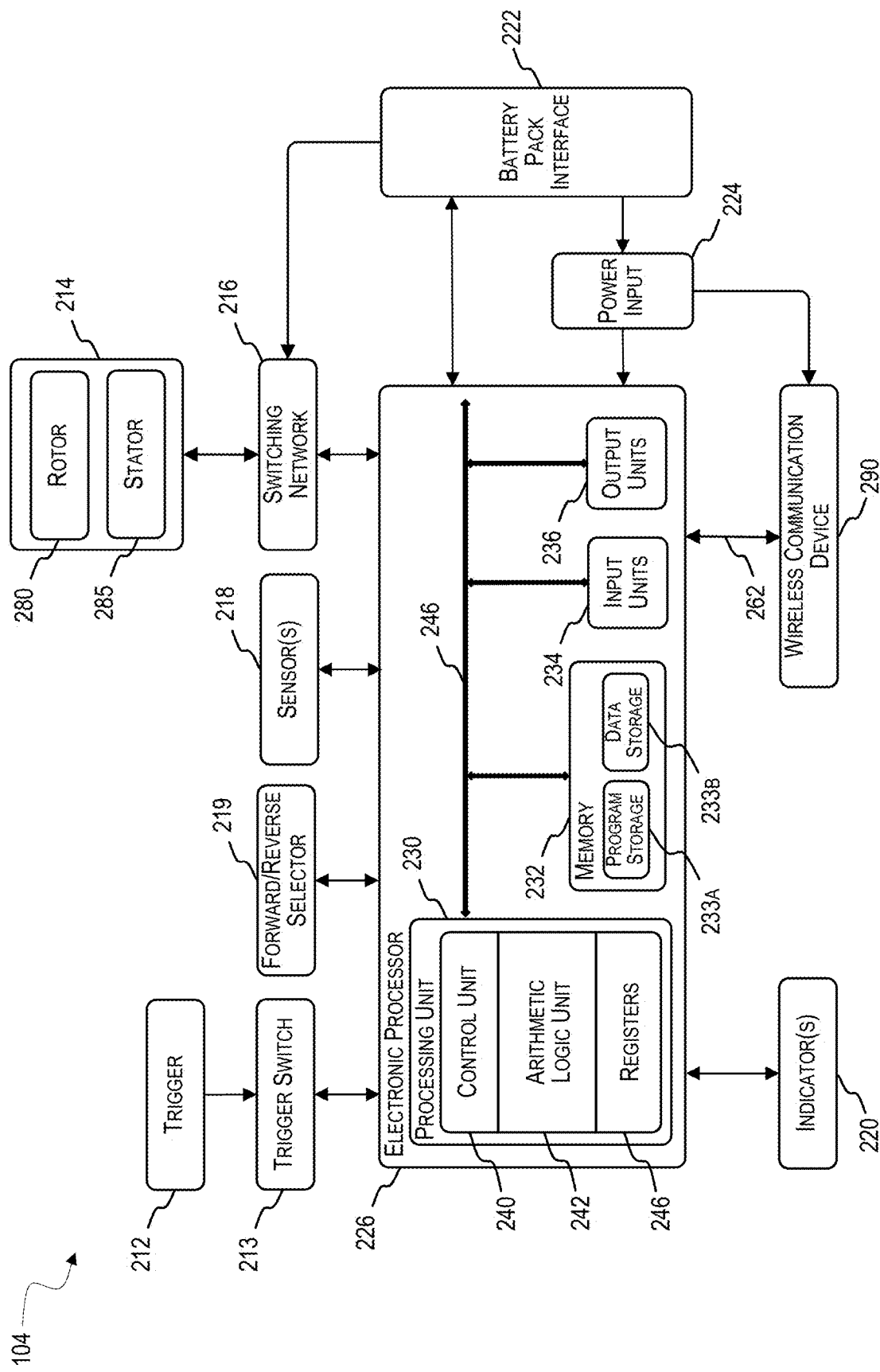
FIGS. 4A-4B illustrate a schematic block diagram of the power tool of FIG. 3 according to one example embodiment.

FIG. 4A illustrates a block diagram of the power tool 104 according to one example embodiment. As shown in FIG. 4A, the power tool 104 includes the motor 214 that includes the rotor 280 and the stator 285. The motor 214 actuates the drive device 210 and allows the drive device 210 to perform the particular task. The battery pack 207 couples to the power tool 104 via a battery pack interface 222 and provides electrical power to energize the motor 214. The trigger 212 is coupled with a trigger switch 213. The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the trigger switch 213 becomes activated, which causes the motor 214 to be energized. When the trigger 212 is released by the user, the trigger switch 213 becomes deactivated, and the motor 214 is de-energized.

As shown in FIG. 4A, the power tool 104 also includes a switching network 216, sensors 218, indicators 220, a power input unit 224, and an electronic processor 226. The battery pack interface 222 includes a combination of mechanical (e.g., the battery pack receiving portion 206 including battery support structure) and electrical components (e.g., terminals) configured to and operable for interfacing (e.g., mechanically, electrically, and communicatively connecting) the power tool 104 with the battery pack 207. The battery pack interface 222 transmits the power received from the battery pack 207 to the power input unit 224. The power input unit 224 includes combinations of active and passive components (e.g., voltage step-down controllers, voltage converters, rectifiers, filters, etc.) to regulate or control the power received through the battery pack interface 222 and provided to a wireless communication device 290 and the electronic processor 226.

The switching network 216 enables the electronic processor 226 to control the operation of the motor 214. Generally, when the trigger 212 is depressed (i.e., the trigger switch 213 is closed), electrical current is supplied from the battery pack interface 222 to the motor 214, via the switching network 216. When the trigger 212 is not depressed, electrical current is not supplied from the battery pack interface 222 to the motor 214. In some embodiments, the trigger switch 213 may include sensors to detect the amount of trigger pull (e.g., released, 20% pull, 50% pull, 75% pull, or fully depressed). In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque, or other parameter. In response to the electronic processor 226 receiving the activation signal from the trigger switch 213, the electronic processor 226 activates the switching network 216 to provide power to the motor 214. The switching network 216 controls the amount of current available to the motor 214 and thereby controls the speed and torque output of the motor 214. The switching network 216 may include several field effect transistors (FETs), bipolar transistors, or other types of electrical switches, such as six FETs in a bridge arrangement. The electronic processor 226, in some embodiments, drives successive switching elements of the switching network 216 with respective pulse width modulation (PWM) signals to alternately drive stator coils of the stator 285, thus inducing rotation of the rotor 280.

In some embodiments, the electronic processor 226 controls whether the motor 214 or other output device (e.g., a light) is enabled/unlocked or disabled locked based on received commands from the wireless fob 140 and/or the external device 108 as explained in greater detail below. For example, the electronic processor 226 may control a switch between the battery pack interface 222 and the motor 214 or other output device to enable/unlock or disable/lock operation of the power tool 104. As explained previously herein, while the example diagram of FIG. 4A represents an impact driver/power tool 104, in some embodiments, the diagram of FIG. 4A represents other power tool devices 102. In such embodiments, the diagram of FIG. 4A may include fewer or additional components arranged in different manners. For example, for a power tool device 102 that is a freestanding work light 102c (see FIG. 1), the trigger 212 may instead be an on/off switch and the motor 214 may instead be a lighting element such as one or more light-emitting diodes (LEDs). However, the freestanding work light may nevertheless include other components shown in FIG. 4A such as the wireless communication device 290 and one or more battery pack interfaces 222 configured to receive one or more power tool battery packs 102b.

The sensors 218 are coupled to the electronic processor 226 and communicate to the electronic processor 226 various signals indicative of different parameters of the power tool 104 or the motor 214. The sensors 218 include, for example, one or more current sensors, one or more voltage sensors, one or more temperature sensors, one or more speed sensors, one or more Hall Effect sensors, etc. For example, the speed of the motor 214 can be determined using a plurality of Hall Effect sensors to sense the rotational position of the motor 214. In some embodiments, the electronic processor 226 controls the switching network 216 in response to signals received from the sensors 218. For example, when the electronic processor 226 determines that the speed of the motor 214 is increasing too rapidly based on information received from the sensors 218, the electronic processor 226 may adapt or modify the active switches or switching sequence within the switching network 216 to reduce the speed of the motor 214. Data obtained via the sensors 218 may be saved in the electronic processor 226 as tool usage data.

The indicators 220 are also coupled to the electronic processor 226 and receive control signals from the electronic processor 226 to turn on and off or otherwise convey information based on different states of the power tool 104. The indicators 220 include, for example, one or more light-emitting diodes ("LEDs"), or a display screen. The indicators 220 can be configured to display conditions of, or information associated with, the power tool 104. For example, the indicators 220 are configured to indicate measured electrical characteristics of the power tool 104, the status of the power tool 104, etc. The indicators 220 may also include elements to convey information to a user through audible or tactile outputs.

As described above, the electronic processor 226 is electrically and/or communicatively connected to a variety of components of the power tool 104. In some embodiments, the electronic processor 226 includes a plurality of electrical and electronic components that provide power, operational control, and protection to the components within the electronic processor 226 and/or power tool 104. For example, the electronic processor 226 includes, among other things, a processing unit 230 (e.g., a microprocessor, a microcontroller, or another suitable programmable device), a memory 232, input units 234, and output units 236. The processing unit 230 includes, among other things, a control unit 240, an arithmetic logic unit ("ALU") 242, and a plurality of registers 244 (shown as a group of registers in FIG. 4A). In some embodiments, the electronic processor 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233a and a data storage area 233b. The program storage area 233a and the data storage area 233b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the electronic processor 226. The software includes, for example, firmware, one or more applications, program data, filters, rules, and other executable instructions. The electronic processor 226 is configured to retrieve from memory and execute, among other things, instructions related to the control processes and methods described herein. The electronic processor 226 is also configured to store power tool device information on the memory 232. The power tool device information stored on the memory 232 may include power tool device identification information (e.g., including a unique identifier of the power tool 104) that is periodically broadcast via the wireless communication device 290 and also power tool device operational information including information regarding the usage of the power tool 104, information regarding the maintenance of the power tool 104, power tool device trigger event information, parameter information to operate the power tool 104 in a particular mode, and other information relevant to operating or maintaining the power tool 104. In some embodiments, the power tool device information stored on the memory 232 includes credential information such as one or more passwords that an external device 108 or wireless fob 140 may provide to the power tool 104 in order for the electronic processor 226 to establish a communication link between the power tool 104 and the external device 108 or the wireless fob 140. In some embodiments, the credential information provided by the external device 108 or the wireless fob 140 (e.g., a particular password) indicates a level of permission that the user of the external device 108 or the wireless fob 140 has to engage in certain communication with the power tool device 104. In other constructions, the electronic processor 226 includes additional, fewer, or different components.

The electronic processor 226 also includes a data connection (e.g., a communication channel) 262 to couple to the wireless communication device 290 which may be located on a same or different printed circuit board as the electronic processor 226 within the housing of the power tool 104. In some embodiments, the data connection 262 includes one or more wires (and/or a ribbon cable) that are connected from the electronic processor 226 to the wireless communication device 290. Via the wireless communication device 290, the electronic processor 226 is configured to communicate with the external device 108, the wireless fob 140, and/or other devices.

Figure 4B:
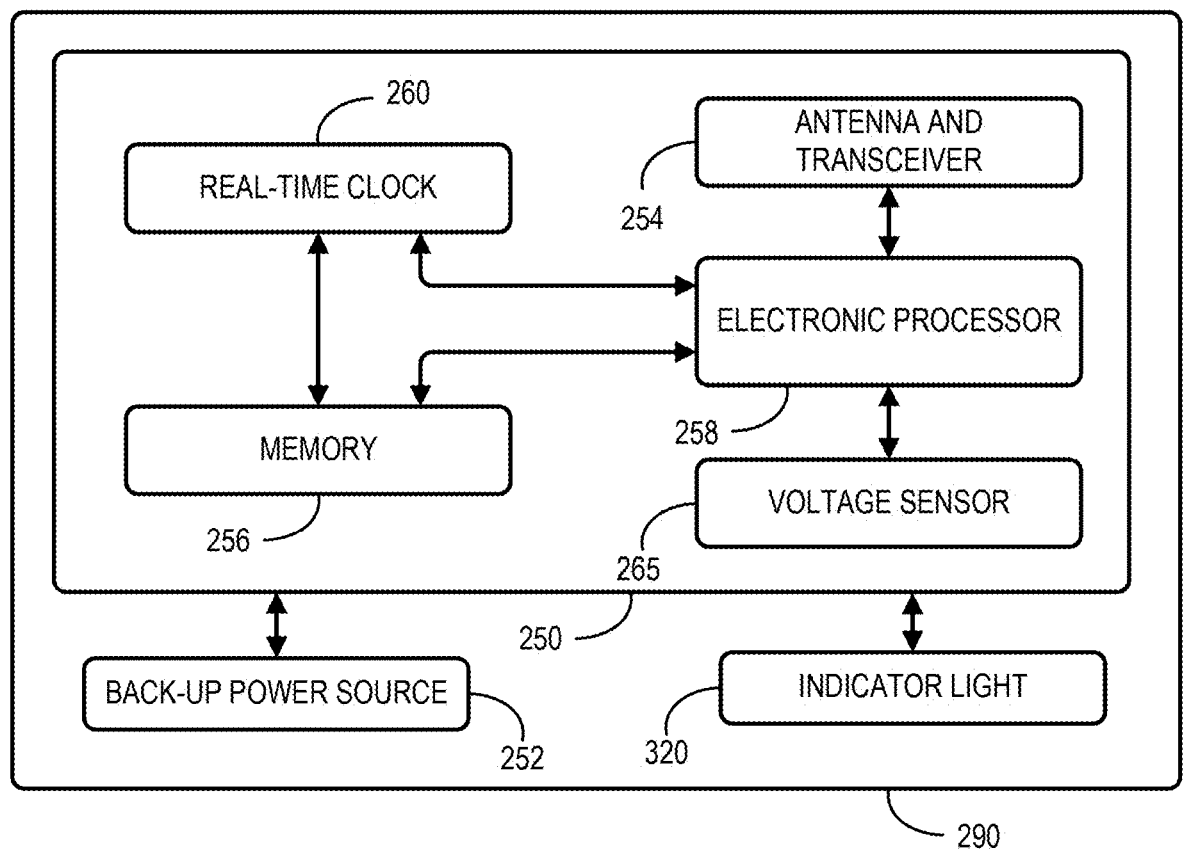

FIG. 4B illustrates a block diagram of the wireless communication device 290 according to one example embodiment. The wireless communication device 290 enables the electronic processor 226 of the power tool 104 to communicate with the external device 108 to transmit power tool device data (e.g., power tool device usage data, configuration data, maintenance data, and the like) and to receive power tool device configuration data (e.g., settings for operating the power tool 104 in a particular mode and the like) and commands to control power tool device components (e.g., turn on a work light, lock/disable and unlock/enable operation of the power tool 104, and the like). The wireless communication device 290 also enables the electronic processor 226 of the power tool 104 to communicate with the wireless fob 140 to receive commands from the wireless fob 140 as explained in greater detail herein. As shown in FIG. 4B, the wireless communication device 290 includes a wireless communication controller 250, a backup power source 252 (e.g., a coin cell battery, another type of battery cell, a capacitor, or another energy storage device), and a real-time clock (RTC) 260. In some embodiments, the RTC 260 is part of the wireless communication controller 250 as shown in FIG. 4B. In other embodiments, however, the RTC 260 is part of the power tool 104 and is permanently connected to the electronic processor 226. In some embodiments, the wireless communication device 290 also includes an indicator light 320 (e.g., an LED that is viewable by a user).

The wireless communication controller 250 includes an antenna and radio transceiver 254, a memory 256, an electronic processor 258, and the RTC 260. The antenna and radio transceiver 254 (i.e., a wireless transceiver) operate together to send and receive wireless messages to and from an external device 108 (or a wireless fob 140) and the electronic processor 258. The memory 256 can store instructions to be implemented by the electronic processor 258 and/or may store data related to communications between the power tool 104 and the external communication device 108 or the like. The electronic processor 258 for the wireless communication controller 250 controls wireless communications between the power tool 104 and the external device 108, and between the power tool 104 and the wireless fob 140. For example, the electronic processor 258 associated with the wireless communication controller 250 buffers incoming and/or outgoing data, communicates with the electronic processor 226 of the power tool 104, and determines the communication protocol and/or settings to use in wireless communications. In other words, the wireless communication controller 250 is configured to receive data from the power tool electronic processor 226 and relay the information to the external device 108 (or the wireless fob 140) via the antenna and transceiver 254. In a similar manner, the wireless communication controller 250 is configured to receive information (e.g., configuration and programming information and/or commands) from the external device 108 (or the wireless fob 140) via the antenna and transceiver 254 and relay the information to the power tool electronic processor 226. In some embodiments, the memory 256 of the wireless communication controller 250 may store the identification information and the credential information of the power tool 104 that allows the external device 108 and/or the wireless fob 140 to establish a communication link with the power tool 104.

In the illustrated embodiment, the wireless communication controller 250 is a Bluetooth® controller. The Bluetooth® controller communicates with the external device 108 (or the wireless fob 140) employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, etc.) over a different type of wireless network. For example, the wireless communication controller 250 may be configured to communicate via Wi-Fi through a wide area network such as the Internet or a local area network, or to communicate through a piconet (e.g., using infrared or NFC communications). As another example, the wireless communication controller 250 may be configured to communicate over a cellular network. The communication via the wireless communication controller 250 may be encrypted to protect the data exchanged between the power tool 104 and the external device 108 (or the wireless fob 140 or a network) from third parties. In some embodiments, the wireless communication controller 250 includes a multi-band/multi-protocol antenna. In other words, a single antenna may be used for multiple transceivers that use different communication protocols (e.g., Bluetooth®, Wi-Fi, GPS, cellular, etc.). In such embodiments, each transceiver may selectively connect to the antenna via a respective switch, power divider, or frequency dependent impedance network.

In some embodiments, the wireless communication controller 250 allows the power tool 104 to be locked out in response to user selection on the external device 108 and/or on the wireless fob 140. In other words, the external device 108 and/or the wireless fob 140 may send a command to the power tool 104 via the wireless communication controller 250 to prevent the motor 214 (or other output device of a different power tool device 102 such as a light) from operating even in response to actuation of the trigger 212 (or other input element of the different power tool device 102 such as an on/off switch). Such a command may control the power tool 104 to immediately lock out or to lock out at a future time. In some embodiments, the wireless communication device 290 may lock out (i.e., disable) the power tool 104 by preventing communications between the battery pack 207 and the power tool 104 or by sending a lock command to the electronic processor 226 instructing the electronic processor to refrain from driving the motor 214 in response to actuation of the trigger 212.

The RTC 260 increments and keeps time independently of the other power tool components. In the illustrated embodiment, the RTC 260 is powered through the wireless communication controller 250 when the wireless communication controller 250 is powered. In some embodiments, however, the RTC 260 is a separate component from the wireless communication controller 250 and may be integrated into the power tool 104. In such embodiments, the RTC 260 receives power from the battery pack 207 (e.g., a main or primary power source) when the battery pack 207 is connected to the power tool 104. The RTC 260 receives power from the backup power source 252 (e.g., a coin cell battery, another type of battery cell, a capacitor, or another energy storage device) when the battery pack 207 is not connected to the power tool 104. Therefore, the RTC 260 keeps track of time regardless of whether the power tool 104 is in operation, and regardless of whether the battery pack 207 is connected to the power tool 104. When no power source is present (i.e., the battery pack 207 is detached from the power tool 104 and the backup power source 252 is removed or depleted), the RTC 260 stores the last valid time. When a power source is replaced (i.e., the battery pack 207 is attached to the power tool 104 and/or the backup power source 252 is replaced), the RTC 260 uses the stored time as a starting point to resume keeping time.

The starting time for the RTC 260 is set to current Greenwich Mean Time (GMT) time at the factory at time of manufacture. The time is updated or synchronized whenever the wireless communication controller 250 communicates with the external device 108. Because GMT time is independent of calendar, seasons, or time schemas, using GMT time allows the power tool 104 or the external device 108 to convert from time indicated by the RTC 260 to localized time for display to the user.

The backup power source 252 also provides power to the RTC 260 to enable continuous tracking of time. In some embodiments, the backup power source 252 does not provide power to energize the motor 214, drive the drive device 210, or power the power tool electronic processor 226, and generally only powers the wireless communication controller 250, the indicator light 320, and the RTC 260 (e.g., in embodiments in which the RTC 260 is separate from the wireless communication controller 250) when the battery pack 207 is not attached to the power tool 104. In other embodiments, the backup power source 252 also provides power to low-power elements such as, for example, LEDs, and the like. In some embodiments, the backup power source 252 also provides power to the power tool electronic processor 226 to allow the power tool electronic processor 226 to communicate with the external device 108 when the battery pack 207 is not coupled to the power tool 104. In some embodiments, the wireless communication controller 250 includes a voltage sensor 265 (see FIG. 4B) coupled to the backup power source 252. The wireless communication controller 250 uses the voltage sensor 265 to determine the state of charge of the backup power source 252. The wireless communication controller 250 may include the state of charge of the backup power source 252 in the identification message that is periodically broadcasted to the external device 108 (or the wireless fob 140). The user can then be alerted by the external device 108 when the state of charge of the backup power source 252 is low.

In the illustrated embodiment, the backup power source 252 includes a coin cell battery. The coin cell battery is merely an example power source. In some embodiments, the backup power source 252 may be another type of battery cell, a capacitor, or another energy storage device. The coin cell battery provides sufficient power to allow the wireless communication controller 250 to broadcast at least minimal identification information. In the illustrated embodiment, the coin cell battery can run for several years by allowing the power tool 104 to only "broadcast" or "advertise" once every few seconds when operating the advertisement state. However, as noted above, in some embodiments, the backup power source 252 provides power to the power tool electronic processor 226 to allow the power tool electronic processor 226 to communicate with the external device 108 (or the wireless fob 140) when the battery pack 207 is not coupled to the power tool 104.

In some embodiments, the coin cell battery is a primary (i.e., non-rechargeable) backup battery. In other embodiments, the backup power source 252 includes a secondary (rechargeable) backup battery cell or a capacitor. In such embodiments, the battery pack 207 provides charging power to recharge the secondary backup battery cell or the capacitor. For example, the power input unit 224 may include charging circuitry to charge the backup power source 252. The rechargeable cell and capacitor may be sized to provide power for several days or weeks before needing to recharge.

In some embodiments, the wireless communication device 290 includes more or fewer components than those shown in FIG. 4B. For example, the wireless communication device 290 may include an accelerometer, a gyroscope, and/or a Global Navigation Satellite System (GNSS) receiver. In some embodiments, the wireless communication device 290 is located within the housing of the power tool 104 and is installed within the housing of the power tool 104 at the time of manufacturing. In other embodiments, the wireless communication device 290 is an insertable wireless communication device configured to be optionally inserted into an insertable device compartment of the power tool 104 by an end user after manufacturing and purchase of the power tool 104. In some embodiments, the insertable wireless communication device that is optionally added to the power tool 104 includes an irreversible lock that, once engaged with the wireless communication device, cannot be unlocked (except by authorized service personnel). In some embodiments, the insertable device compartment is configured to receive a dummy module (e.g., a plastic housing without internal electronic components) that may be installed at the time of manufacturing the power tool 104 but may be later removed and replaced with an insertable wireless communication device by a user when desired.

Figure 5:
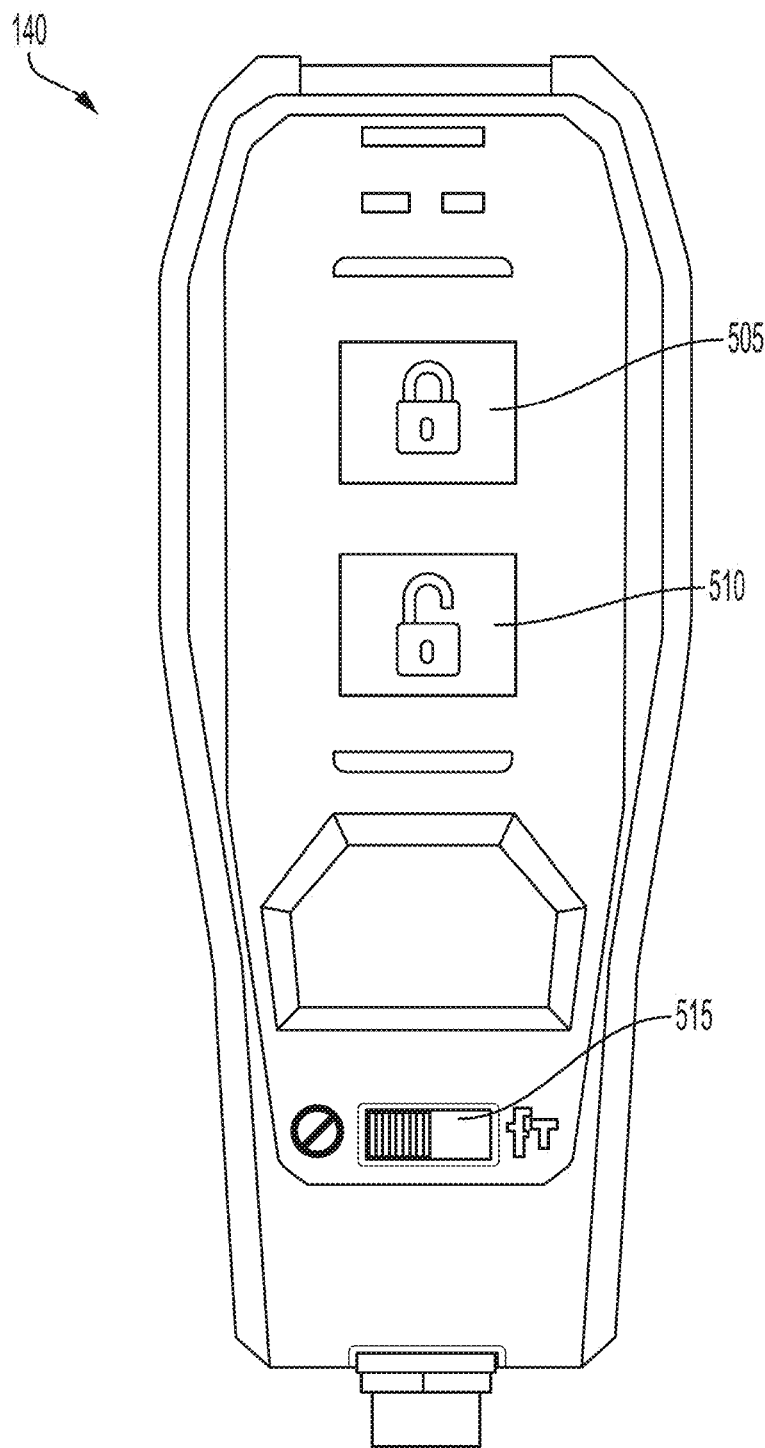
FIG. 5 illustrates a wireless fob of the communication system of FIG. 1 according to one example embodiment.

FIG. 5 illustrates the wireless fob 140 according to one example embodiment. As shown in FIG. 5, the wireless fob 140 may include one or more input devices (e.g., physical button(s)) such as a lock button 505 and an unlock button 510 that are configured to be actuated by a user to send a lock command or an unlock command, respectively, as described herein. The wireless fob 140 may also include a selector switch 515 that allows the user to select whether wireless communication to/from the wireless fob 140 is enabled or disabled. For example, when the selector switch 515 is in a right-most position, the wireless fob 140 is configured to engage in wireless communication such as receiving identification beacon signals from power tool devices 102 and transmitting signals to the power tool devices 102. On the other hand, when the selector switch 515 is in a left-most position, wireless communication of the wireless fob 140 is disabled such that the wireless fob 140 will not receive identification beacon signals from nearby power tools devices 102 and will not transmit signals to the power tool devices 102. In some embodiments, the selector switch 515 is a power switch to prevent an action from occurring (e.g., transmission of a command) when the buttons 505 and 510 are actuated accidentally. Similar to the above example, when the selector switch 515 is in the right-most position, the wireless fob 140 is configured to wirelessly send commands in response to one of the buttons 505 and 510 being actuated. On the other hand, when the selector switch 515 is in the left-most position, the wireless fob 140 is configured to ignore actuation of the buttons 505 and 510 and not send wireless commands in response to one of the buttons 505 and 510 being actuated. The wireless fob 140 shown in FIG. 5 is an example. In other embodiments, the wireless fob 140 may include fewer or additional components. For example, the wireless fob 140 may include a display screen such as a touch screen display that provides one or more input devices in the form of a lock button and/or an unlock button on a graphical user interface of the display screen. As another example, the wireless fob 140 may not include the selector switch 515 in some embodiments.

Figure 6:
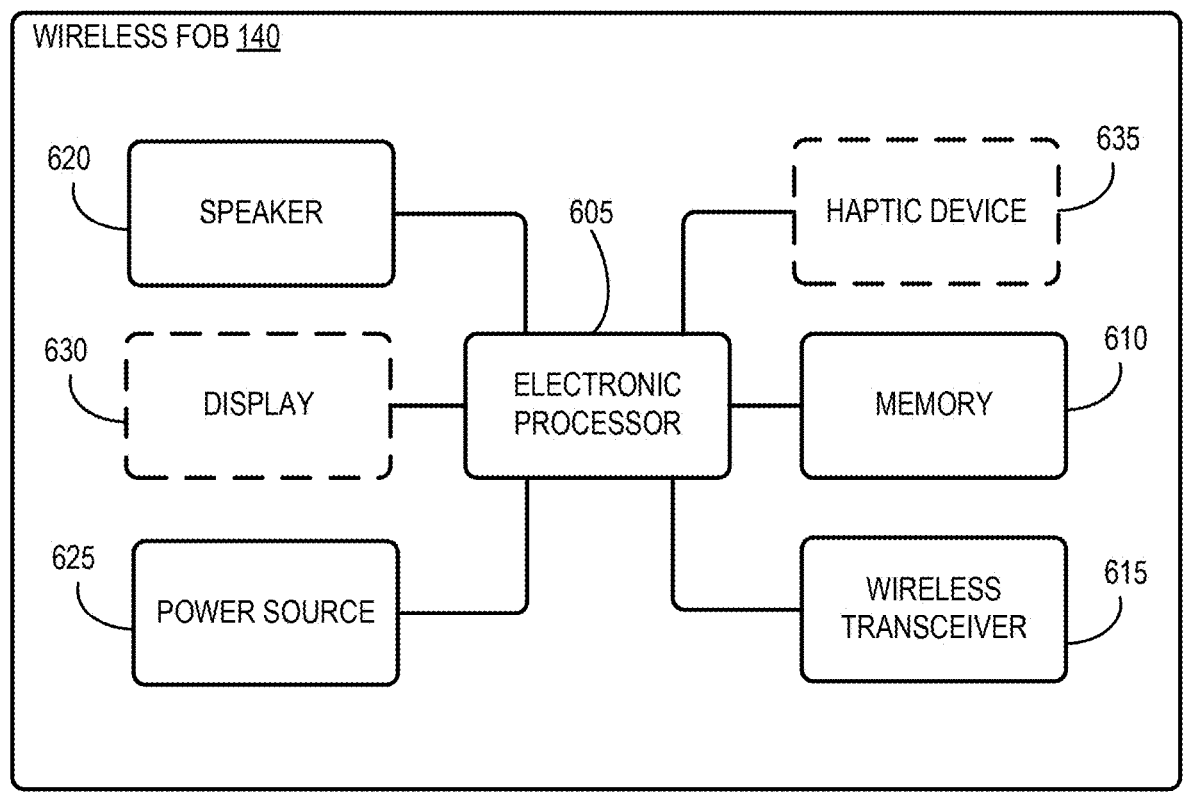
FIG. 6 illustrates a schematic block diagram of the wireless fob of FIG. 5 according to one example embodiment.

FIG. 6 illustrates a block diagram of the wireless fob 140 according to one example embodiment. In the embodiment shown in FIG. 6, the wireless fob 140 includes an electronic processor 605 (for example, a microprocessor or other electronic processing device). The electronic processor 605 includes input and output interfaces (not shown) and is electrically coupled to a memory 610, a wireless transceiver 615, a speaker 620, and a power source 625. In some embodiments, the electronic processor 605 is similar to one or more of the electronic processors 114, 226, and 258 of the devices described previously herein. In some embodiments, the wireless fob 140 includes fewer or additional components in configurations different from that illustrated in FIG. 6. For example, the wireless fob 140 includes a display 630, a microphone, or a global positioning system (GPS) receiver or a similar component that may determine the geographic coordinates of the location of the wireless fob 140. As another example, the wireless fob 140 may include a second wireless transceiver as explained in greater detail below. As yet another example, the wireless fob 140 may include a haptic device 635 (e.g., a motor) configured to produce a haptic notification by causing a housing of the wireless fob 140 to vibrate. As another example, the wireless fob 140 includes a real-time clock (RTC) coupled to the electronic processor 605 that may be similar to the RTC 260 described previously herein. In some embodiments, the wireless fob 140 performs functionality other than the functionality described below.

The memory 610 may include read only memory (ROM), random access memory (RAM), other non-transitory computer-readable media, or a combination thereof. The electronic processor 605 is configured to receive instructions and data from the memory 610 and execute, among other things, the instructions. In particular, the electronic processor 605 executes instructions stored in the memory 610 to perform the methods described herein. In some embodiments, the memory 610 is similar to one or more of the memories 130, 232, and 256 of the devices described previously herein. The memory 610 may store wireless fob identification information (e.g., including a unique identifier of the wireless fob 140) that is periodically broadcast via the wireless transceiver 615.

The wireless transceiver 615 sends and receives data to and from the other devices within the system 100. For example, the wireless transceiver 615 may include a transceiver for wirelessly communicating (e.g., short-range communication) with one or more of the power tool devices 102 and the external device 108. In some embodiments, the wireless transceiver 615 includes one or more antennas coupled to one or more transceivers. The electronic processor 605 may communicate data to and from other devices in the system 100 via the wireless transceiver 615 (for example, identification information and credential information of power tool devices, lock/unlock commands, and the like). The wireless transceiver 615 may include, for example, a Bluetooth® communication controller. In some embodiments, the wireless transceiver 615 is similar to one or more of the transceivers 118 and 254 of the devices described previously herein. In some embodiments, the wireless fob 140 includes a second wireless transceiver that communicates with devices in the communication system 100 using a different communication protocol such as longer range radio frequency (RF) communication. In some embodiments, the wireless fob 140 does not include a wireless transceiver configured to communicate directly with the server 112 via a network. Rather, the external device 108 serves as intermediary to provide identification information and credential information of power tool devices 102 from the server 112 to the wireless fob 140 for use by the wireless fob 140 as explained in greater detail below.

The power source 625 may be a rechargeable or replaceable battery such as a coin cell battery or another type of battery. The power source 625 is located within the housing of the wireless fob 140 and provides power to the electronic processor 605 as well as other components of the wireless fob 140. Although FIG. 6 shows the power source coupled only to the electronic processor 605, the power source 625 may provide power to other components of the wireless fob 140 (e.g., the wireless transceiver 615, the speaker 620, the display 630, the haptic device 635, and/or the like) using appropriate conditioning circuitry similar to the power input 224 of the power tool 104 explained previously herein.

In embodiments of the wireless fob 140 that include the display 630, the display 630 may display images, video, and/or text to the user. The display 630 may be a liquid crystal display (LCD) screen or an organic light emitting display (OLED) display screen. In some embodiments, a touch sensitive input interface may be incorporated into the display 630 as well, allowing the user to interact with content provided on the display 630.

With reference to the external device 108, FIG. 7 illustrates a nearby devices screen 705 of a graphical user interface (GUI) on the touch screen display 126 of the external device 108. The nearby devices screen 705 is used to identify and communicatively pair with power tool devices 102 and wireless fobs 140 within wireless communication range of the external device 108. For instance, in response to a user selecting the "scan" input 710, the external device 108 scans a radio wave communication spectrum used by the power tool devices 102 and the wireless fobs 140 to identify power tool devices 102 and/or wireless fobs 140 within range that are advertising (e.g., periodically broadcasting their identification information that includes their unique identifier). The identified power tool devices 102 and wireless fobs 140 that are advertising are then listed on the nearby devices screen 705. As shown in FIG. 7, in response to a scan, three devices that are advertising (advertising devices 715a-c) are listed in an identified device list 720. In some embodiments, the "scan" input 710 is not present or does not need to be pressed to cause the external device 108 to identify power tool devices 102 and/or wireless fobs 140 within range that are advertising. Rather, the external device 108 may be configured to periodically scan for such devices or may be configured to be constantly capable of receiving identification information from such devices when the devices are within communication range of the external device. In some embodiments, when a power tool device 102 or wireless fob 140 is already communicatively paired with a different external device, the power tool device 102 or wireless fob 140 is not advertising and, as such, is not listed in the identified tool list 720 even though the power tool 104 may be nearby (within wireless communication range of) the external device 108.

The identification information received from the advertising devices 715 is used by the external device 108 to identify the device type of each advertising device 715. For example, a table of device types may be included in the memory 130 of the external device 108. The table may be indexable by the identification information received from the advertising devices 715, allowing the external device 108 to display the device type information 730 as shown in FIG. 7 (e.g., a part/serial number or other associated information of the device).

In some embodiments, identification information received from advertising tools 715 is used to obtain further information about the device, when available. For instance, the identification information is sent to the server 112 and used as an index or search term for a database of device information that is stored in the server 112. For instance, the database may store and respond to the external device 108 with a device nickname, an icon, and other device identifiers. As shown in the nearby devices screen 705, the advertising tools 715 include device type information 730 including the device nickname, the part/serial number, and the icon. In some instances, the advertising tools 715 provide some or all of the device type information 730 listed to the external device 108, rather than the external device 108 obtaining the device type information 730 from the server 112. In some instances, the external device 108 includes a cache of device information stored in the memory 130 for power tool devices 102 and wireless fobs 140 previously paired with by the external device 108, and which is indexable by the received identification information from advertising devices 715. The cached device information may include the icon and other device type information 730.

In some embodiments, the external device 108 sends the identification information received from advertising devices 715 to the server 112 to allow the server 112 to determine whether the user associated with the external device 108 has permission to communicate with one or more of the advertising devices 715. In some embodiments, the external device 108 may not display nearby devices on the nearby devices screen 705 unless the server 112 indicates that the user associated with the external device 108 has permission to communicate with the advertising device 715. In other embodiments, the external device 108 may display all nearby advertising devices 715 for which identification information was received on the nearby devices screen 705 but may only allow the external device 108 to communicatively pair with advertising devices 715 that the server 112 has indicated that the user associated with the external device 108 has permission with which to communicate.

Assuming that the user has permission to communicatively pair with each of the advertising devices 715 as determined by the server 112, the server 112 sends credential information of the advertising devices 715 to the external device 108 to be used to communicatively pair with the advertising devices 715. For example, the credential information may include one or more passwords that correspond to passwords that are stored in the memories of the advertising devices 715 (e.g., at the time of their manufacturing). In some embodiments, the advertising devices 715 are configured to ignore received communication (e.g., commands, requests for information, and the like) from the external device 108 unless the external device 108 provides a matching password that allows the external device 108 to communicatively pair with an advertising device 715. In some embodiments, the credential information for each advertising device 715 is unique to that of any other advertising device 715. In some embodiments, different passwords for a particular advertising device 715 grant the user a different level of control/access of the advertising device 715. For example, a password may allow a user to retrieve usage data from the advertising device 715, but may not allow the user to change operational parameters of the advertising device 715. As another example, a password may be configured to be used by service personnel to change operational parameters of the advertising device 715 and/or retrieve usage data that is not accessible to an end user of the advertising device 715. The server 112 sends credential information including one or more passwords to the external device 108 for each advertising device 715 based on the permission level of the user of the external device 108 with respect to each advertising device 715. In some embodiments, at least some of the credential information for each advertising device 715 (e.g., one or more passwords) is the same for two or more advertising devices 715. For example, a service/maintenance personnel password may be the same for two or more advertising devices 715.

From the nearby devices screen 705, the user can select one of the advertising devices 715 from the identified tool list 720 to communicatively pair with the selected advertising device 715. Each type of advertising device 715 with which the external device 108 can communicate includes an associated device graphical user interface stored in the memory 130 of the external device 108 or retrieved from the server 112 by the external device 108. Once a communicative pairing occurs between the external device 108 and an advertising device 715, the core application software 312 of the memory 130 of the external device 108 obtains the applicable device interface for the type of advertising device 715 that is paired. The touch screen display 126 then displays the applicable device interface. A device interface includes one or more screens enabling a user to obtain tool operational data, configure a power tool device 102 or a wireless fob 140, or both. For example, the external device 108 may allow the user to set a maximum speed, a starting speed, a finishing speed, a torque level, and/or a trigger ramp-up of the motor 214 of the power tool 104. As another example, the external device 108 may allow the user to set a work light duration (i.e., schedule) and/or a work light brightness of a power tool device 102. The external device 108 may also allow the user to enable/disable (i.e., unlock/lock) operation of a power tool device 102. While some screens and options of a device interface are common to multiple tool interfaces of different types of advertising devices 715, generally, each tool interface includes screens and options particular to the associated type of advertising device 715. The power tool 104 has limited space for user input buttons, triggers, switches, and dials. However, the external device 108 and touch screen display 126 provide a user the ability to map additional functionality and configurations to the power tool 104 to change the operation of the tool 104. Thus, in effect, the external device 108 provides an extended user interface for the power tool 104, providing further customization and configuration of the power tool 104 than otherwise possible or desirable through physical user interface components on the tool. Examples further explaining aspects and benefits of the extended user interface are found below.

As indicated by FIG. 7, in some embodiments, the wireless fob 140 may be included in a device inventory of a user and may pair with the external device 108 in a similar manner as a power tool device 102 (e.g., power tool 104). In some embodiments, the wireless fob 140 is also configured to perform similar functions as the external device 108 to pair with nearby power tool devices 102 and send commands to the power tool devices 102. For example, the wireless fob 140 is configured to send an enable/disable command (i.e., an unlock/lock command) that allows/prevents operation of the motor 214 of the power tool 104 in response to the trigger 212 of the power tool 104 being actuated. As another example, the wireless fob 140 is configured to send an on command and off command that controls a light of the light device 102*c* of FIG. 1 to turn on and off, respectively. To be able to pair with the power tool devices 102 and send such commands, the wireless fob 140 may receive identification information and credential information of one or more power tool devices 102 from the external device 108 and store this information on the memory 610 of the wireless fob 140. For example, the wireless fob 140 may receive identification information and credential information of one or more power tool devices 102 in an inventory of a user according to selections made by the user on the external device 108 as explained herein.

FIG. 8 illustrates a control screen 805 that provides a device interface for the wireless fob 140 in response to pairing of the external device 108 and the wireless fob 140. For example, the external device 108 and the wireless fob 140 may be paired with each other, as explained previously herein, in response to the advertising device 715*c* (i.e., the wireless fob 140) being selected on the nearby devices screen 705 (assuming that the user of the external device 108 has permission to communicatively pair with the wireless fob 140 as explained previously herein). As shown in FIG. 8, the control screen 805 may include an icon 810 of the wireless fob 140. The control screen 805 may also include the device type information 730 associated with the wireless fob 140.

As indicated by FIG. 8, the control screen 805 allows the user to control numerous features of the wireless fob 140. In some embodiments, the control screen 805 includes a device selection button 815 to allow the user to select which power tool devices 102 for the external device 108 to transmit corresponding identification information and credential information to the wireless fob 140. In some embodiments, in response to the device selection button 815 being pressed, the electronic processor 114 of the external device 108 displays a device inventory screen on the touch screen display 126 that is similar to the nearby devices screen 705 of FIG. 7. However, the device inventory screen may include all power tool devices 102 with which the user has permission to communicate regardless of whether the power tool devices 102 are currently within communication range of the external device 108. In some embodiments, the device inventory screen may include only power tool devices 102 that are owned by the user rather than all power tool devices 102 with which the user has permission to communicate. The user may then select one, multiple, or all of the power tool devices 102 in a list of power tool devices 102 displayed on the device inventory screen. The identification information and credential information of the selected power tool devices 102 is transmitted by the external device 108 to the wireless fob 140 to allow the wireless fob 140 to communicatively pair with the selected power tool devices 102. For example, the identification information and credential information of the selected power tool devices 102 is transmitted by the external device 108 to the wireless fob 140 in response to the user pressing a save button 820 on the control screen 805 after selecting the selected power tool devices 102. In some embodiments, the external device 108 may not display a separate screen for selection of power tool devices 102 for credentials to be sent to the wireless fob 140. Rather, in some embodiments, the control screen 805 may include a textbox with a scrollbar that displays all power tool devices 102 with which the user has permission to communicate and a corresponding list box that displays which power tool devices 102 have been selected.

As shown in FIG. 8, in some embodiments, the control screen 805 includes a credential expiration period parameter 825*a* that allows the user to set an amount of time during which the wireless fob 140 has permission to use the credential information of the selected power tool devices 102 to communicatively pair (i.e., establish a communication link) with the power tool devices 102 to send commands to the power tool devices 102. The user may enter a number of days into a textbox 825*b* or may adjust a slider 825*c* to a desired number of days. While FIG. 8 shows the credential expiration period in terms of days, in some embodiments, the credential expiration period may additionally or alternatively be displayed in hours, minutes, or the like. The credential expiration period is transmitted to the wireless fob 140 along with the identification and credential information of the selected power tool devices 102. The wireless fob 140 stores the credential expiration period in the memory 610. Upon expiration of the credential expiration period (i.e., the amount of time set by the user), the electronic processor 605 is configured to cease use of the received credential information such that the wireless fob 140 is no longer able to communicatively pair with the selected power tool devices 102 associated with the credential expiration period. Because the credential expiration period is transmitted to wireless fob 140 and stored in the memory 610 of the wireless fob 140, the wireless fob 140 may be configured to cease use of the received credential information at the end of the credential expiration period regardless of whether the wireless fob 140 is within communication range of the external device 108.

In some embodiments, the wireless fob 140 is configured to re-pair with the external device 108 or another external device 108 (i.e., re-establish a communication link between the wireless fob 140 and the external device 108 or another external device 108) when the wireless fob 140 is moved within communication range of the external device 108 after the credential expiration period has expired. The wireless fob 140 may receive re-authentication of permission to use the credential information from the external device 108. For example, in response to re-establishing a communication link with the external device 108, the wireless fob 140 may reset the credential expiration period to its original amount of time. As another example, the external device 108 may re-transmit the credential expiration period and the identification and credential information of the selected power tool devices 102 in response to re-establishing a communication link with the wireless fob 140.

As indicated by the above explanation of the credential expiration period parameter 825*a*, the wireless fob 140 may receive time-limited credentials from the external device 108 that allow the wireless fob 140 to communicate with selected power tool devices for a user-selected amount of time. Once the amount of time has elapsed, the wireless fob 140 re-pairs with the external device 108 to be optionally re-credentialed to communicate with the selected power tool device 102. Such communication between devices may be useful to, for example, ensure that foremen carrying wireless fobs 140 at a construction site periodically meet with a construction site manager whose external device 108 provides credentials to the wireless fobs 140 of the foremen.

As shown in FIG. 8, in some embodiments, the control screen 805 includes an unlock command parameter 830*a* that allows the user to set whether (i) an unlock command transmitted by the wireless fob 140 to nearby power tool devices 102 is transmitted automatically upon recognition of a power tool device 102 for which the wireless fob 140 has corresponding credential information or (ii) an unlock command is transmitted by the wireless fob 140 to nearby power tool devices 102 only in response to a user of the wireless fob 140 pressing the unlock button 510 of the wireless fob 140 (i.e., manually). The user may drag a toggle switch 830*b* to a left-most position or a right-most position to select whether the wireless fob 140 transmits unlock commands automatically or manually. A selected unlock command type is transmitted to the wireless fob 140 along with the identification and credential information of the selected power tool devices 102 (for example, in response to the user pressing the save button 820). The wireless fob 140 stores the unlock command type in the memory 610 and operates in accordance with the unlock command type as explained below.

Figure 9:
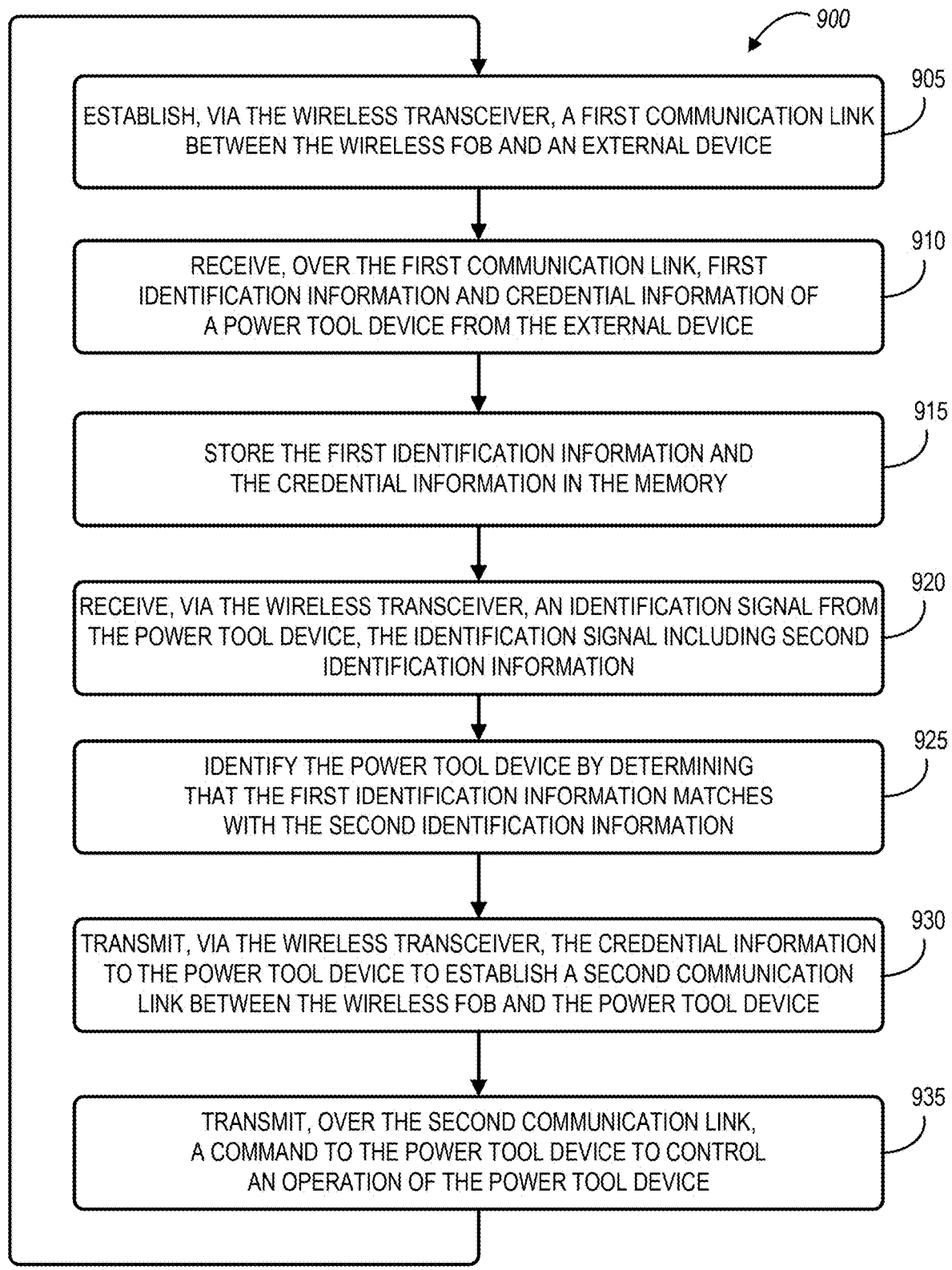
FIG. 9 illustrates a flow chart of a method performed by the wireless fob to transmit a command to a power tool device of the communication system of FIG. 1 according to one example embodiment.

When the wireless fob 140 is configured to send unlock commands automatically, the wireless fob 140 receives an identification beacon signal from a nearby power tool device 102 (e.g., see block 920 of FIG. 9) and determines whether identification information included in the identification beacon signal matches with the identification information stored in the memory 610 that indicates the selected power tool devices 102 with which the wireless fob 140 is authorized to communicate (e.g., see block 925 of FIG. 9). In response to determining that the identification information included in the identification beacon signal matches with the identification information stored in the memory 610, the wireless fob 140 identifies the matching power tool device 102 and transmits associated credential information of the matching power tool device 102 from the memory 610 to the power tool device 102 to communicatively pair with the power tool device 102 (i.e., establish a communication link between the external device 108 and the power tool device 102) (e.g., see block 930 of FIG. 9). In response to the communication link being established, the wireless fob 140 transmits an unlock command to the power tool device 102 to enable operation of the power tool device 102 (e.g., see block 935 of FIG. 9). In other words, the wireless fob 140 automatically pairs with and sends an unlock command to a nearby power tool device 102 in response to recognizing that an identification beacon signal from the nearby power tool device 102 matches identification information stored in the memory 610 of the wireless fob 140. With the wireless fob 140 configured in this manner, the wireless fob 140 may be configured to function as a proximity-based unlocking/enabling device such that power tool devices 102 within communication range of the wireless fob 140 are unlocked/enabled by the wireless fob 140 while power tool devices 102 outside communication range of the wireless fob 140 are locked/disabled. For example, by setting an unlock duration 835*a*

(as described below) to five seconds or the like, the power tool devices 102 generally must receive the unlock/enable command from the wireless fob 140 every five seconds otherwise the power tool device 102 will be locked/disabled (i.e., unable to operate).

On the other hand, when the wireless fob 140 is configured to send unlock commands manually, in response to determining that the identification information included in an identification beacon signal from a power tool device 102 matches with the identification information stored in the memory 610 (e.g., see block 925 of FIG. 9), the wireless fob 140 provides a notification, via an output device (e.g., a light-emitting diode (LED), the display 630, the speaker 620, and the haptic device 635), indicating that the wireless fob 140 has received the identification beacon signal from the power tool device 102 with matching identification information as that stored in the memory 610. In embodiments that include the display 630 on the wireless fob 140, the display 630 may display an identity of the power tool device 102 (e.g., a part/serial number, a nickname, and/or an icon). In response to receiving the notification from the wireless fob 140, the user can decide whether to press the unlock button 510 (or the lock button 505) to enable operation of the power tool device 102 (or disable operation of the power tool device 102). Thus, when the wireless fob 140 is configured to send unlock commands manually, the wireless fob 140 may send credential information and commands (e.g., see block 930 and 935 of FIG. 9) to nearby power tool devices 102 in response to one of the buttons 505 and 510 being pressed by the user as opposed to automatically as described above.

As shown in FIG. 8, in some embodiments, the control screen 805 includes an unlock duration parameter 835*a* that allows the user to set a time period during which the operation of the power tool device 102 is to be enabled after the power tool device 102 receives the unlock/enable command from the wireless fob 140. The user may enter a number of hours into a textbox 835*b* or may adjust a slider 835*c* to a desired number of hours. While FIG. 8 shows the unlock duration in terms of days, in some embodiments, the unlock duration may additionally or alternatively be displayed in minutes, seconds, days, or the like. The unlock duration is transmitted to the wireless fob 140 along with the identification and credential information of the selected power tool devices 102 (for example, in response to the user pressing the save button 820). The wireless fob 140 stores the unlock duration in the memory 610 and may transmit the unlock duration to power tool devices 102 along with the unlock/enable command. The power tool devices 102 are configured to receive the unlock/enable command and the unlock duration from the wireless fob 140, and are configured to lock/disable the operation of the power tool device 102 after the time period set by the user as the unlock duration expires regardless of whether the power tool device 102 is within communication range of the wireless fob or the external device 108. In some embodiments, the power tool device 102 may re-enable its operation upon re-pairing with the wireless fob 140 and re-receiving the unlock/enable command from the wireless fob 140. With the power tool devices 102 configured in this manner, the wireless fob 140 may be configured to function as a proximity-based unlocking/enabling device such that power tool devices 102 within communication range of the wireless fob 140 are unlocked/enabled by the wireless fob 140 while power tool devices 102 outside communication range of the wireless fob 140 are locked/disabled. For example, by setting the unlock duration 835*a* to five seconds or the like, power tool devices 102 generally must receive the unlock/enable command from the wireless fob 140 every five seconds otherwise the power tool device 102 will be locked/disabled (i.e., unable to operate).

In some embodiments, one or more of the unlock parameters 830*a* and 835*a* include a toggle switch 840 that allows the user to select whether the unlock parameters 830*a* and/or 835*a* are pre-set by the user of the external device 108 (as explained above) or selectable at the wireless fob 140 by a user of the fob 140. For example, the wireless fob 140 may include the display 630 or extra buttons in addition to those shown in FIG. 5. The display 630 or the additional buttons may allow the user of the wireless fob 140 to set the unlock command parameter 830*a* and/or the unlock duration parameter 835*a* when the toggle switch 840 of these unlock parameters has been set to "selectable at fob." The ability for the fob user to select the unlock parameters 830*a* and 835*a* at the wireless fob 140 as determined based on the setting of the toggle switch 840 is transmitted to the wireless fob 140 along with the identification and credential information of the selected power tool devices 102 (for example, in response to the user pressing the save button 820). The wireless fob 140 operates in accordance with the setting of the toggle switch 840 to allow or prevent the fob user from setting the unlock parameters 830*a* and/or 835*a* at the wireless fob 140.

The ranges of the parameters 825*a* and 835*a* shown in FIG. 8 are examples and may be different in other embodiments. For example, the minimum and/or maximum values of the sliders 825*c* and 835*c* may be higher or lower in other embodiments. Additionally, the external device 108 may control other parameters of the wireless fob 140 in addition to the parameters shown on the control screen 805 of FIG. 8.

Unless explained otherwise, the explanation herein of devices such as the wireless fob 140, the external device 108, and the power tool devices 102 performing functions or communicating with each other applies to the corresponding electronic processor of such devices performing these functions either alone or in combination with other components of the devices (e.g., a corresponding wireless transceiver).

As described above, in some situations, the power tool devices 102 and/or the wireless fob 140 may be configured to function in a manner such that the wireless fob 140 acts as a proximity-based unlocking/enabling device. In such situations, power tool devices 102 within communication range of the wireless fob 140 are unlocked/enabled by the wireless fob 140 while power tool devices 102 outside communication range of the wireless fob 140 are locked/disabled. In some embodiments, the wireless fob 140 utilizes the wireless transceiver 615 (e.g., a Bluetooth® transceiver) when acting as a proximity-based unlocking/enabling device. In some embodiments, the wireless fob 140 includes a second wireless transceiver different from the wireless transceiver 615. In such embodiments, the second wireless transceiver may operate using a different communication protocol than Bluetooth® (such as longer range radio frequency communication).

In some embodiments, when acting as a proximity-based unlocking/enabling device, the wireless fob 140 broadcasts an unlock code as part of an unlock command, via at least one of the wireless transceiver 615 and the second wireless transceiver, to the power tool devices 102 within communication range of the wireless fob 140 (e.g., at a construction site). In some embodiments, the unlock code may be the same for a plurality of power tool devices 102, and the power tool devices 102 may be configured to receive the unlock code without communicatively pairing with the wireless fob 140. In other embodiments, the wireless fob 140 may periodically and repeatedly transmit an unlock command that includes the unlock code along with the credential information of each power tool device 102 (e.g., a unique tool password). For example, the wireless fob 140 may continuously cycle through broadcasting the credential information and unlock code to a first, second, and Nth power tool device 102 regardless of whether the wireless fob 140 has received an identification beacon signal from the first, second, or Nth power tool device 102. In this manner, the power tool devices 102 may recognize that the unlock command is being broadcast by an authorized device (i.e., the wireless fob 140) and may unlock/enable the power tool device 102 in response to receiving the unlock code and valid credential information.

In other embodiments, the wireless fob 140 may broadcast one or more unlock commands to one or more power tool devices only in response to receiving an identification beacon signal from that particular power tool device 102 or from any one of the power tool devices 102 with which the wireless fob 140 has permission to communicate based on the stored identification and credential information of the power tool devices 102 received from the external device 108. In other words, in some embodiments, the wireless fob 140 transmits an unlock command to one or more power tool devices 102 with which the wireless fob 140 has permission to communicate automatically in response to receiving an identification beacon signal from the one or more power tool device 102. However, in other embodiments and as explained previously herein, the wireless fob 140 may be configured to send unlock commands manually in response to determining that an identification beacon signal from the one or more power tool devices 102 matches with the identification information stored in the memory 610 of the wireless fob 140. In such embodiments, the wireless fob 140 provides a notification, via an output device (e.g., a light-emitting diode (LED), the display 630, the speaker 620, and the haptic device 635), indicating that the wireless fob 140 has received the identification beacon signal from the power tool device 102 with matching identification information as that stored in the memory 610. In response to the notification, the user may then actuate the lock button 505 or the unlock button 510 to send a corresponding command to the one or more power tool devices 102 within communication range of the wireless fob 140.

In some embodiments, when a command (whether automatic or manual) is sent by the wireless fob 140 to multiple power tool devices 102, the wireless fob 140 may be configured to pair with each power tool device 102 to send the command to each power tool device 102. In other embodiments, the wireless fob 140 may be configured to send the command to multiple power tool devices 102 in accordance with one of the broadcast command methods described above.

In some embodiments, the communication range of the at least one of the wireless transceiver 615 and the second wireless transceiver that is used to broadcast the unlock code for proximity-based unlocking/enabling is adjustable by a user on the wireless fob 140 and/or on the external device 108 (e.g., as a parameter on the control screen 805 of FIG. 8). In other words, a distance that a power tool device 102 must be from the wireless fob 140 to be unlocked/enabled or otherwise receive commands from the wireless fob 140 may be adjustable by a user, for example, by adjusting a broadcast range/power of the wireless fob 140.

FIG. 9 illustrates a flow chart of a method 900 performed by the wireless fob 140 according to one example embodiment and in accordance with the explanations herein. Example techniques for implementing the blocks of the method 900 are described above and not necessarily restated in this discussion of FIG. 9. At block 905, the electronic processor 605 of the wireless fob 140 establishes, via the wireless transceiver 615, a first communication link between the wireless fob 140 and an external device 108. At block 910, the electronic processor 605 receives, over the first communication link, first identification information and credential information of a power tool device 102 from the external device 108. At block 915, the electronic processor 605 stores the first identification information and the credential information in the memory 610 of the wireless fob 140. At block 920, the electronic processor 605 receives, via the wireless transceiver 615, an identification signal (i.e., an identification beacon signal) from the power tool device 102. The identification signal may include identification information of the power tool device 102 (i.e., second identification information). At block 925, the electronic processor 605 identifies the power tool device 102 based on a comparison of the stored first identification information to the second identification information included in the identification signal. For example, in response to receiving the identification signal from the power tool device 102, the electronic processor 605 identifies the power tool device 102 by determining whether the second identification information included in the identification signal matches with the previously stored first identification information of any power tool devices 102 stored in the memory 610 as explained previously herein.

If the second identification information included in the identification signal matches previously-stored identification information stored in the memory 610, at block 930, the electronic processor 605 may transmit, via the wireless transceiver 615, the credential information of the power tool device 102 (that corresponds to the previously-stored identification information) to the power tool device 102 to establish a second communication link between the wireless fob 140 and the power tool device 102. At block 935, the electronic processor 605 transmits, over the second communication link, a command (e.g., an unlock command or a lock command) to the power tool device 102 to control an operation of the power tool device 102.

As explained previously herein, one or both of the credential information and the command transmitted at blocks 930 and 935 may be transmitted by the wireless fob 140 automatically or manually depending on settings of the wireless fob 140 programmed by a user. For example, transmitting one or both of the credential information and the command automatically at block 930 and 935 includes the wireless fob 140 transmitting one or both of the credential information and the command in response to determining that the second identification information included in the identification signal matches previously-stored identification information stored in the memory 610. As another example, transmitting one or both of the credential information and the command manually at block 930 and 935 includes the wireless fob 140 transmitting one or both of the credential information and the command in response to receiving a user input via an input device (e.g., a button on a touchscreen, a physical button such as the lock button 505 or the unlock button 510, or the like). Also as explained previously herein, in the manual mode, the user may be notified of a nearby power tool device 102 within communication range of the wireless fob 140 by an output device (e.g., a light-emitting diode (LED), a display screen, a speaker, and a haptic device) of the wireless fob 140 providing an output to the user.

In some embodiments, the power tool device 102 transmits a confirmation of receipt of the command back to the wireless fob 140. In some embodiments, the wireless fob 140 may display or otherwise provide a notification to a user of the wireless fob 140 to indicate that the wireless fob 140 received confirmation of receipt of the command from the power tool device 102 (e.g., illuminate an LED or the like). As indicated in FIG. 9, in some embodiments, the electronic processor 605 is configured to repeat the method 900 to send a power tool device 102 more than one command and/or to send commands to more than one power tool device 102.

In some embodiments, one or more blocks of the method 900 are bypassed and/or replaced with other steps. For example, in some embodiments, blocks 920, 925, and 930 are bypassed, and, in block 935, the credential information, identification information, and unlock (or lock) command are periodically broadcast (e.g., as a one way transmission). For example, as described above, the broadcast message may be transmitted over a wireless transceiver different than (and with longer range) than the wireless transceiver used to communicate with the external device 108. Various power tool devices 102 may receive the broadcast message and (a) determine whether the message was intended for that power tool device 102 (e.g., by comparing the identification information, credential information or both to pre-stored values to determine whether a match occurs), and (b) in response to determining that the broadcast message was intended for the power tool device 102, the power tool device 102 unlocks its operation (e.g., indefinitely, for a predetermined amount of time previously stored on the power tool device 102, or for an amount of time specified with the broadcast command). The power tool devices 102 will generally stay unlocked until the predetermined amount of time (or specified amount of time) has passed since a broadcast message was received.

As another example of the method 900 being modified with other steps in some embodiments, an additional block may be included between blocks 925 and 930 that corresponds to the manual unlocking/locking of power tool devices 102 described previously herein. For example, in response to identifying the power tool device 102 based on the identification information at block 925, the electronic processor 605 provides a notification, via an output device (e.g., a light-emitting diode (LED), the display 630, the speaker 620, and the haptic device 635), indicating that the wireless fob 140 has received the identification beacon signal from the power tool device 102 with matching identification information as that stored in the memory 610. In response to the notification, the user may then actuate the lock button 505 or the unlock button 510. In response to determining that one of the buttons 505 or 510 has been actuated, the electronic processor 605 proceeds to blocks 930 and 935 to send a corresponding command to the power tool device 102.

In some embodiments, any actions performed by the wireless fob 140 with respect to power tool devices 102 (e.g., locking/unlocking of power tool devices 102) may also be performed by the external device 108 when the external device 108 is within communication range of the power tool devices 102. Accordingly, the external device 108 may be used to control operation of the power tool devices 102 and may additionally or alternatively delegate operational control capabilities of the power tool devices 102 to the wireless fob 140.

Thus, embodiments discussed herein provides among other things, a wireless fob that communicates with an external device for retrieving identification information and credential information of power tool devices to be used by the wireless fob to communicate with the power tool devices to send commands to the power tool devices.

We claim:

1. A wireless fob comprising:
   a wireless transceiver;
   a memory; and
   an electronic processor coupled to the wireless transceiver and to the memory, the electronic processor configured to:
   establish, via the wireless transceiver, a first communication link between the wireless fob and an external device,
   receive, over the first communication link, first identification information and credential information of a power tool device from the external device,
   store the first identification information and the credential information in the memory,
   receive, via the wireless transceiver, an identification signal from the power tool device, the identification signal including second identification information,
   identify the power tool device by determining that the first identification information matches with the second identification information,
   transmit, via the wireless transceiver, the credential information to the power tool device,
   establish a second communication link between the wireless fob and the power tool device based on the credential information,
   transmit, over the second communication link, a command to the power tool device to control an operation of the power tool device,
   receive, over the first communication link and from the external device, a credential expiration period that indicates a first amount of time, after receiving the credential information, during which the wireless fob has permission to use the credential information to establish the second communication link,
   cease use of the credential information upon expiration of the first amount of time, and
   receive, over the first communication link and from the external device, an unlock duration time that indicates a second amount of time during which the power tool device is configured to be enabled after receiving the command from the wireless fob, wherein the command includes an enable command that allows operation of a motor of the power tool device in response to a trigger of the power tool device being actuated.

2. The wireless fob of claim 1, wherein the external device includes a handheld portable device.

3. The wireless fob of claim 1, wherein after the credential expiration period has expired, the electronic processor is configured to:
   re-establish, via the wireless transceiver, the first communication link between the wireless fob and the external device;
   receive, over the first communication link and from the external device, re-authentication of the permission to use the credential information to establish the second communication link;
   transmit, via the wireless transceiver, the credential information to the power tool device; and re-establish the second communication link between the wireless fob and the power tool device based on the credential information.

4. The wireless fob of claim 1, wherein the command includes the second amount of time during which the operation of the power tool device is to be enabled, wherein the power tool device is configured to disable the operation in response to:
the second amount of time expiring, and
another command not being received by the power tool device from the wireless fob prior to the second amount of time expiring.

5. The wireless fob of claim 1, wherein the command is transmitted to an insertable wireless communication device of the power tool device.

6. The wireless fob of claim 1, wherein the power tool device includes a light device, and wherein the command includes an on/off command that controls a light of the light device to be on/off.

7. The wireless fob of claim 1, further comprising an output device configured to provide an output to a user, wherein the electronic processor is configured to:
in response to receiving the identification signal from the power tool device, provide a notification, via the output device, indicating that the wireless fob has received the identification signal from the power tool device.

8. The wireless fob of claim 7, wherein the output device includes at least one of a group consisting of a light-emitting diode (LED), a display screen, a speaker, and a haptic device configured to provide a haptic notification.

9. The wireless fob of claim 1, further comprising an input device configured to receive a user input, wherein the electronic processor is configured to receive the user input via the input device;
wherein, in response to receiving the user input via the input device, the electronic processor is configured to (i) transmit the credential information to the power tool device and establish the second communication link between the wireless fob and the power tool device, and (ii) transmit the command to the power tool device over the second communication link.

10. The wireless fob of claim 1, wherein, in response to identifying the power tool device by determining that the first identification information matches with the second identification information, the electronic processor is configured to at least one of:
transmit, via the wireless transceiver, the credential information to the power tool device and establish the second communication link between the wireless fob and the power tool device, and
transmit, over the second communication link, the command to the power tool device to control the operation of the power tool device.

11. The wireless fob of claim 1, wherein the electronic processor is configured to:
receive, over the first communication link, third identification information and second credential information of a second power tool device from the external device;
store the third identification information and the second credential information in the memory;
receive, via the wireless transceiver, a second identification signal from the second power tool device, the second identification signal including fourth identification information;
identify the second power tool device by determining that the third identification matches the fourth identification information;
transmit, via the wireless transceiver, the second credential information to the second power tool device;
establish a third communication link between the wireless fob and the second power tool device based on the second credential information; and
transmit, over the third communication link, a second command to the second power tool device to control an operation of the second power tool device.

12. A method of operating a wireless fob to control a power tool device, the method comprising:
establishing, via a wireless transceiver of the wireless fob, a first communication link between the wireless fob and an external device;
receiving, with an electronic processor of the wireless fob and over the first communication link, first identification information and credential information of the power tool device from the external device;
storing, with the electronic processor, the first identification information and the credential information in a memory of the wireless fob;
receiving, with the electronic processor via the wireless transceiver, an identification signal from the power tool device, the identification signal including second identification information;
identifying, with the electronic processor, the power tool device by determining that the first identification information matches with the second identification information;
transmitting, with the electronic processor via the wireless transceiver, the credential information to the power tool device;
establishing a second communication link between the wireless fob and the power tool device based on the credential information;
transmitting, with the electronic processor and over the second communication link, a command to the power tool device to control an operation of the power tool device;
receiving, with the electronic processor and over the first communication link, a command parameter from the external device, wherein the command parameter indicates whether (i) the command is transmitted by the wireless fob automatically in response to identifying the power tool device or (ii) the command is transmitted by the wireless fob only in response to the wireless fob receiving a user input;
receiving, over the first communication link and from the external device, a credential expiration period that indicates a first amount of time, after receiving the credential information, during which the wireless fob has permission to use the credential information to establish the second communication link;
ceasing, with the electronic processor, use of the credential information upon expiration of the first amount of time; and
receiving, over the first communication link and from the external device, an unlock duration time that indicates a second amount of time during which the power tool device is configured to be enabled after receiving the command from the wireless fob, wherein the command includes an enable command that allows operation of a motor of the power tool device in response to a trigger of the power tool device being actuated.

13. The method of claim 12, wherein the external device includes a handheld portable device.

14. The method of claim 12, further comprising, after the credential expiration period has expired:

re-establishing, via the wireless transceiver, the first communication link between the wireless fob and the external device;
receiving, with the electronic processor and from the external device over the first communication link, re-authentication of the permission to use the credential information to establish the second communication link;
transmitting, with the electronic processor via the wireless transceiver, the credential information to the power tool device; and
re-establishing the second communication link between the wireless fob and the power tool device based on the credential information.

15. The method of claim 12, wherein the power tool device includes a light device, and wherein transmitting the command includes transmitting an on/off command that controls a light of the light device to be on/off.

16. The method of claim 15, further comprising:
receiving, with the electronic processor via an input device of the wireless fob, the user input; and
in response to receiving the user input via the input device, transmitting, with the electronic processor via the wireless transceiver, at least one of (i) the credential information to the power tool device and establishing the second communication link between the wireless fob and the power tool device, and (ii) the command to the power tool device over the second communication link.

17. A communication system comprising:
a power tool device including a first wireless transceiver;
an external device including a second wireless transceiver, wherein the external device includes a handheld portable device; and
a wireless fob including:
  a third wireless transceiver,
  a memory, and
  an electronic processor coupled to the third wireless transceiver and to the memory, the electronic processor configured to:
    establish, via the third wireless transceiver and the second wireless transceiver, a first communication link between the wireless fob and the external device, wherein the first communication link includes a first short-range communication link,
    receive, over the first communication link, first identification information and credential information of the power tool device from the external device,
    store the first identification information and the credential information in the memory,
    receive, via the third wireless transceiver, an identification signal from the first wireless transceiver, the identification signal including second identification information,
    identify the power tool device by determining that the first identification information matches with the second identification information,
    transmit, via the third wireless transceiver, the credential information to the first wireless transceiver;
    establish a second communication link between the wireless fob and the power tool device based on the credential information, wherein the second communication link includes a second short-range communication link,
    transmit, over the second communication link, a command to the power tool device to control an operation of the power tool device,
    receive, over the first communication link and from the external device, a credential expiration period that indicates a first amount of time, after receiving the credential information, during which the wireless fob has permission to use the credential information to establish the second communication link,
    cease use of the credential information upon expiration of the first amount of time, and
    receive, over the first communication link and from the external device, an unlock duration time that indicates a second amount of time during which the power tool device is configured to be enabled after receiving the command from the wireless fob, wherein the command includes an enable command that allows operation of a motor of the power tool device in response to a trigger of the power tool device being actuated.

18. The communication system of claim 17, wherein the external device includes a handheld portable device.

19. The communication system of claim 17, wherein the power tool device includes a light device, and wherein the command includes an on/off command that controls a light of the light device to be on/off.

20. The communication system of claim 17,
wherein the credential expiration period is displayed on a screen of the external device and selected via a first user input on the external device; and
wherein the unlock duration time is displayed on the screen of the external device and selected via a second user input in the external device.

* * * * *